(12) United States Patent
Ekart et al.

(10) Patent No.: US 7,192,545 B2
(45) Date of Patent: Mar. 20, 2007

(54) THERMAL CRYSTALLIZATION OF A MOLTEN POLYESTER POLYMER IN A FLUID

(75) Inventors: Michael Paul Ekart, Kingsport, TN (US); Mary Therese Jernigan, Kingsport, TN (US); Cory Lee Wells, Gray, TN (US); Larry Cates Windes, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 10/986,129

(22) Filed: Nov. 10, 2004

(65) Prior Publication Data

US 2005/0154183 A1 Jul. 14, 2005

Related U.S. Application Data

(63) Continuation-in-part of application No. 10/683,522, filed on Oct. 10, 2003, now abandoned.

(51) Int. Cl.
*B29C 47/88* (2006.01)
*B29C 33/40* (2006.01)
*B29C 47/00* (2006.01)
*C08F 6/00* (2006.01)
*B28B 3/20* (2006.01)

(52) U.S. Cl. .................. 264/211.13; 528/499; 528/503; 264/176.1; 264/219

(58) Field of Classification Search ................ 528/499, 528/503; 264/176.1, 211.13, 219
See application file for complete search history.

(56) References Cited

U.S. PATENT DOCUMENTS

| 2,706,722 | A | 4/1955 | Caldwell |
|---|---|---|---|
| 3,014,011 | A | 12/1961 | Zoetbrood |
| 3,390,134 | A | 6/1968 | Kibler |
| 3,749,539 | A | 7/1973 | Galbreath et al. |
| 3,753,637 | A | 8/1973 | Gasior et al. |
| 3,972,852 | A | 8/1976 | Inata et al. |
| 4,123,207 | A | 10/1978 | Dudley |
| 4,251,198 | A | 2/1981 | Altenburg |
| 4,289,874 | A | 9/1981 | Bockrath |
| 4,300,877 | A | 11/1981 | Andersen |
| 4,470,791 | A | 9/1984 | Tanaka et al. |
| 4,500,271 | A | 2/1985 | Smith |
| 4,554,303 | A | 11/1985 | Petke et al. |
| 4,591,629 | A | 5/1986 | El-Ghatta et al. |
| 4,728,275 | A | 3/1988 | DiLullo et al. |
| 4,728,276 | A | 3/1988 | Pauley et al. |
| 4,822,546 | A | 4/1989 | Lohkamp |
| 5,059,103 | A | 10/1991 | Bruckmann et al. |
| 5,164,478 | A | 11/1992 | Lee et al. |
| 5,187,216 | A | 2/1993 | Cassell et al. |
| 5,241,046 | A | 8/1993 | Shiraki et al. |
| 5,290,913 | A | 3/1994 | McAllister et al. |
| 5,310,515 | A | 5/1994 | Jurgen et al. |
| 5,334,669 | A | 8/1994 | Ghisolfi |
| 5,393,871 | A | 2/1995 | Yau et al. |
| 5,444,144 | A | 8/1995 | Tanaka et al. |
| 5,532,333 | A | 7/1996 | Stouffer et al. |
| 5,532,335 | A | 7/1996 | Kimball et al. |
| 5,540,868 | A | 7/1996 | Stouffer et al. |
| 5,573,820 | A | 11/1996 | Harazoe et al. |
| 5,597,586 | A | 1/1997 | Wilson et al. |
| 5,599,562 | A | 2/1997 | Harris et al. |
| 5,611,983 | A | 3/1997 | Ma et al. |
| 5,628,947 | A | 5/1997 | Keilert |
| 5,663,290 | A | 9/1997 | Heise et al. |
| 5,744,578 | A | 4/1998 | Duh |
| 5,766,533 | A | 6/1998 | Mears et al. |
| 6,066,713 | A | 5/2000 | Mrose et al. |
| 6,068,910 | A | 5/2000 | Flynn et al. |
| 6,099,778 | A | 8/2000 | Nelson et al. |
| 6,107,445 | A | 8/2000 | Paschke et al. |
| 6,113,997 | A | 9/2000 | Massey et al. |
| 6,129,961 | A | 10/2000 | Sonoda et al. |
| 6,159,406 | A | 12/2000 | Shelby et al. |
| 6,160,085 | A | 12/2000 | Fujimori et al. |
| 6,228,302 | B1 | 5/2001 | Al Ghatta |
| 6,274,656 | B1 | 8/2001 | Ma et al. |
| 6,332,765 | B1 | 12/2001 | Spelleken |
| 6,461,575 | B1 | 10/2002 | Duh et al. |
| 6,474,969 | B1 | 11/2002 | Ready et al. |
| 6,500,915 | B1 | 12/2002 | Fujimori et al. |
| 6,512,078 | B1 | 1/2003 | Gantillon et al. |

(Continued)

FOREIGN PATENT DOCUMENTS

CS 200745 B 6/1978

(Continued)

*Primary Examiner*—Nathan M. Nutter
(74) *Attorney, Agent, or Firm*—Bernard J. Graves, Jr.; Dennis V. Carmen

(57) ABSTRACT

A process for crystallizing a polyester polymer by introducing a molten polyester polymer, such as a polyethylene terephthalate polymer, into a liquid medium at a liquid medium temperature greater than the $T_g$ of the polyester polymer, such as at a temperature ranging from 100° C. to 190° C., and allowing the molten polyester polymer to reside in the liquid medium for a time sufficient to crystallize the polymer under a pressure equal to or greater than the vapor pressure of the liquid medium. A process flow, underwater cutting process, crystallization in a pipe, and a separator are also described.

82 Claims, 8 Drawing Sheets

U.S. PATENT DOCUMENTS

| | | |
|---|---|---|
| 6,551,087 B1 | 4/2003 | Martin |
| 6,551,699 B1 | 4/2003 | Flynn |
| 6,592,350 B1 | 7/2003 | Chszaniecki |
| 2002/0171159 A1 | 11/2002 | Matthaei et al. |
| 2004/0009254 A1 | 1/2004 | Eloo et al. |
| 2004/0011330 A1 | 1/2004 | Sauler et al. |

FOREIGN PATENT DOCUMENTS

| | | |
|---|---|---|
| DE | 2347013 A | 3/1975 |
| DE | 226896 | 9/1985 |
| DE | 3503330 A | 8/1986 |
| DE | 19848245 | 4/2000 |
| DE | 10149474 | 4/2003 |
| DE | 10215344 | 10/2003 |
| DE | 10333648 A1 | 9/2004 |
| EP | 867458 | 9/1998 |
| EP | 0974438 A1 | 1/2000 |
| EP | 0988342 A1 | 3/2000 |
| EP | 0821640 B1 | 6/2000 |
| EP | 1181140 A1 | 2/2002 |
| EP | 0804499 B1 | 7/2002 |
| EP | 0937117 B1 | 1/2003 |
| JP | 53054295 | 5/1978 |
| JP | 56055426 A | 5/1981 |
| JP | 56118420 A | 9/1981 |
| JP | 56147823 A | 11/1981 |
| JP | 59045107 | 9/1982 |
| JP | 5925815 A | 2/1984 |
| JP | 59045106 A | 3/1984 |
| JP | 59219328 A | 12/1984 |
| JP | 60026026 A | 2/1985 |
| JP | 1180309 A | 7/1989 |
| JP | 8073611 | 3/1996 |
| JP | 3095166 | 6/1999 |
| JP | 2000044666 A | 2/2000 |
| JP | 3041851 | 5/2000 |
| JP | 2000143791 | 5/2000 |
| JP | 3075406 | 8/2000 |
| JP | 2001040081 | 2/2001 |
| JP | 2001072753 | 3/2001 |
| JP | 2001072754 A | 3/2001 |
| JP | 2001079836 A | 3/2001 |
| JP | 2001081171 A | 3/2001 |
| JP | 2001081174 A | 3/2001 |
| JP | 2001106777 | 4/2001 |
| JP | 2001131277 | 5/2001 |
| JP | 2001247669 | 9/2001 |
| JP | 2001302777 | 10/2001 |
| JP | 2001302778 | 10/2001 |
| JP | 2003181831 | 12/2001 |
| JP | 2002105189 | 4/2002 |
| JP | 2002332340 | 11/2002 |
| JP | 2002338676 | 11/2002 |
| JP | 2003137993 | 5/2003 |
| JP | 2003200420 | 7/2003 |
| JP | 2003206344 | 7/2003 |
| JP | 2003206346 | 7/2003 |
| JP | 2003306537 | 10/2003 |
| JP | 2003306538 | 10/2003 |
| JP | 2003306540 | 10/2003 |
| JP | 2003327680 | 11/2003 |
| JP | 2003342358 | 12/2003 |
| WO | WO 92/18554 | 10/1992 |
| WO | WO 96/22320 | 7/1996 |
| WO | WO 96/33853 | 10/1996 |
| WO | WO 97/05186 | 2/1997 |
| WO | WO 97/31968 | 9/1997 |
| WO | WO 97/42250 | 11/1997 |
| WO | WO 99/47605 | 9/1999 |
| WO | WO 200023497 A1 | 4/2000 |
| WO | WO 00/32673 | 6/2000 |
| WO | WO 200032677 | 6/2000 |
| WO | WO 00/46004 | 8/2000 |
| WO | WO 00/64961 | 11/2000 |
| WO | WO 200105566 A1 | 1/2001 |
| WO | WO 01/10622 A1 | 2/2001 |
| WO | WO 200112698 | 2/2001 |
| WO | WO 03/046046 A1 | 6/2003 |
| WO | WO 2004/033174 A1 | 4/2004 |

US 7,192,545 B2

THERMAL CRYSTALLIZATION OF A MOLTEN POLYESTER POLYMER IN A FLUID

This application is a Continuation-In-Part of prior application Ser. No. 10/683,522, filed on Oct. 10, 2003 now abandoned, fully incorporated herein by reference. The invention pertains to the crystallization of a polyester polymer, and more particularly to the crystallization of molten polyester polymer in a liquid medium.

FIELD OF THE INVENTION

BACKGROUND OF THE INVENTION

At the beginning of the solid-stating process, PET pellets are crystallized usually with hot air or in mechanically-mixed, hot-oil-heated vessel. Building molecular weight in the solid-state requires extensive crystallization and/or annealing so that pellets will not stick as they enter the solid-stating reactor at typically 195 to 220° C. Polyester (or copolyester) pellets are generally supplied to converters in a semi-crystalline form. Converters desire to process semi-crystalline pellets rather than amorphous pellets because the semi-crystalline pellets can be dried at higher temperatures without agglomerating. Drying the pellets immediately prior to extrusion of the melt to make bottle performs is necessary to prevent hydrolytic degradation and loss of intrinsic viscosity (It.V.) of the melt inside the extruder. However, drying amorphous polyester pellets at or above the $T_g$ of PET without first crystallizing the pellets will cause the pellets to agglomerate at higher temperatures (140° C. to 180° C.) in the dryers. Feeding amorphous pellets to an extruder will cause the screw to be wrapped as the pellets become hot enough to crystallize in the extrusion zone.

From the pellet manufacturing side, a typical commercial process involves forming the polyester polymer via melt phase polymerizing up to an It.V. ranging from about 0.5 to 0.70, extruding the melt into strands, quenching the strands, cutting the cooled polymer strands into solid amorphous pellets, heating the solid pellets to above their $T_g$ and then crystallizing (also known as crystallization from the glass since the pellets to be crystallized start at a temperature below their $T_g$), and then heating the pellets in the solid state to an even higher temperature while under nitrogen purge (or vacuum) in order to continue to build molecular weight or It.V. (i.e. solid stating). The solid stating process runs hot enough to make it necessary to first crystallize the pellets to prevent agglomeration at the solid stating temperatures. Thus, crystallization is necessary to avoid agglomeration of the pellets during solid stating and during the drying step prior to extruding the melt into bottle performs.

Typical melt phase polyester reactors produce only amorphous pellets. To make these pellets crystalline, they are usually heated to elevated temperatures in a crystallization vessel while being constantly stirred using paddles or other mechanical rotary mixing means in order to prevent sticking or clumping in the crystallization vessel. The crystallizer is nothing more that a heated vessel with a series of paddles or agitator blades to keep the pellets stirred (e.g. Hosakawa Bepex Horizontal Paddle Dryer). Rotary mixing means suffer the disadvantage of requiring additional energy for mechanical rotational movement, and rotational mechanical agitation required to keep the pellets from sticking can also cause chipping and other damage to the pellets, leading to dust generation or the presence of "fines" in the crystallizer and product. These small pieces of chipped off plastic can often cause extrusion problems if not properly removed.

Alternately, a crystallizer can consist of injecting hot gas into a vessel known as a hot, fluidized mixed bed, mostly containing already crystallized pellets which prevents the amorphous pellets being fed to the vessel from sticking to one another (e.g. a Buhler precrystallizer spout bed unit). Such commercial processes utilize the "thermal" crystallization technique by employing a hot gas, such as steam, air, or nitrogen as the heating medium. The residence time in hot fluidized mixed bed processes is up to six hours. These processes also suffer the disadvantage in that large quantities of gas are required, requiring large blowers and making the processes energy intensive.

Each of these crystallization processes is rather slow and energy-intensive. Crystallization processes can take up to six hours, require energy to turn mechanical rotary mixing means in some cases, have high energy requirements to process hot gases or oil, and the pellets are usually cooled from the pelletizer to about 25 to 35° C. after which they are reheated prior to and during crystallization. Moreover, crystallization vessels are fed with low It.V. pellets suitable, which in turn are solid stated into higher It.V. pellets required for making a suitable bottle. It would be desirable to crystallize polyester polymers in a more energy efficient manner or in lower cost equipment. For example, it would be desirable to reduce the residence time of the polyester polymer in the crystallizer, or provide a process which avoids the energy requirements of mechanical rotary mixing means or of cooling and reheating between pelletization and crystallization, or which even could avoid the step of solid stating altogether, while providing to the converter a high temperature crystallized pellet to enable the converter to dry the pellets at conventional temperatures (typically at 140° C. to 180° C.). Obtaining any one of these advantages would be desirable.

SUMMARY OF THE INVENTION

There is now provided a process for crystallizing a polyester polymer comprising introducing a molten polyester polymer into a liquid medium at a liquid medium temperature greater than the $T_g$ of the polyester polymer.

In another embodiment, there is provided a process for crystallizing a molten polyester polymer comprising:
 a) directing molten polyester polymer through a die, and
 b) before the temperature of the molten polyester polymer falls below its $T_g$, first contacting the molten polyester with a liquid medium when the liquid medium temperature is greater than the $T_g$ of the polyester polymer and crystallizing the molten polyester polymer.

In yet another embodiment, there is provided a process for crystallizing a polyester polymer, comprising:
 a) directing a molten polyester polymer through a die, and
 b) before the temperature of the molten polyester polymer falls below its $T_g$, contacting the molten polyester with a liquid medium at a liquid medium temperature greater than the $T_g$ of the polyester polymer for a time sufficient to provide a crystallized polyester polymer having a degree of crystallinity of at least 10%, followed by
 c) separating, under a pressure equal to or greater than the vapor pressure of the liquid medium, the crystallized polyester polymer from the liquid medium.

We have also discovered a process for crystallizing a polyester polymer comprising introducing a polyester polymer to a feed of liquid medium, crystallizing the polymer in the liquid medium, separating the polymer and the liquid medium from each other, optionally drying the separated polymer, and directing at least a portion of the separated liquid medium to or as said feed of liquid medium.

In the process of the invention, there is also provided a process for separating a crystallized polyester polymer having an It.V. of at least 0.55 from a liquid medium comprising separating said polymer from said liquid medium under a pressure equal to or greater than the vapor pressure of the liquid medium, drying the separated crystallized polyester polymer, and following separation and before drying, directing a flow of cool liquid onto the separated crystallized polyester polymer, wherein the temperature of the cool liquid is less than the temperature of the separated crystallized polyester polymer.

Moreover, there is also provided a process for separating a crystallized polyester polymer having an It.V. of at least 0.55 from a liquid medium comprising crystallizing molten polyester polymer is a hot liquid medium having a temperature greater than the $T_g$ of the polymer to form a crystallized polyester polymer, separating the crystallized polymer from the hot liquid medium under a pressure equal to or greater than the vapor pressure of the liquid medium, and directing a flow of cool liquid onto the crystallized polymer before separation, wherein the temperature of the cool liquid is less than the temperature of the hot liquid medium.

The process of the invention also allows one to crystallize high It.V. polyester polymer comprising contacting a molten polyester polymer having an It.V. of 0.70 dL/g or more with a liquid medium at a liquid medium temperature sufficient to induce crystallinity to the molten polyester polymer, allowing the molten crystallized polymer to cool to a pellet, and isolating the pellet without increasing the molecular weight of the pellet in the solid state.

By crystallizing the molten polyester polymer according to the process of the invention, there is now also provided the advantage that a molded part or sheet can be made from pellets comprising:

d) drying polyester pellets crystallized from molten polyester polymer;

e) introducing the dried pellets into an extrusion zone to form molten PET polymer; and f) forming a sheet, strand, fiber, or a molded part from extruded molten PET polymer.

In yet a more detailed embodiment of the process, there is also provided a process for crystallizing a polyester polymer, comprising a) directing a molten polyester polymer through a die, and b) before the temperature of the molten polyester polymer falls below its $T_g$, i) cutting the polymer into globules with a cutter;

ii) contacting the globules with a flow of liquid medium at a liquid medium temperature greater than the $T_g$ of the polyester polymer to form a flow of slurry;

iii) directing the flow of slurry away from the cutter to a crystallizer and allowing the globules to reside in the crystallization zone under a pressure equal to or greater than the vapor pressure of the liquid medium for a time sufficient to impart a degree of crystallinity of at least 10% to the globules, thereby forming crystallized globules; and c) separating in a separation apparatus under a pressure equal to or greater than the vapor pressure of the liquid medium, the crystallized globules or resulting pellets from the liquid medium to form a stream of crystallized polyester polymer and a stream of separated liquid medium, wherein:

i) at least a portion of the source of the flow of liquid medium in step bii) is the stream of separated liquid medium; and ii) the stream of crystallized polyester polymer is directed to a dryer for removing at least a portion of the residual moisture on or in the crystallized polymer.

In a part of the process, we have also discovered a process for underfluid cutting a molten polyester polymer comprising a die plate having an inner surface disposed toward a cutter each contained within a housing having an inlet and an outlet, and continuously directing a flow of hot liquid medium having a first temperature through the inlet and exiting through the outlet and continuously directing a flow of a cool liquid medium having a second temperature into the housing, wherein the first temperature is higher than the second temperature.

Moreover, we have also discovered a process for thermally crystallizing a molten polyester polymer in a pipe comprising directing a flow of molten polyester polymer in a liquid medium through a pipe having an aspect ratio L/D of at least 15:1, wherein the molten polyester polymer is crystallized in the pipe at a liquid medium temperature greater than the $T_g$ of the polyester polymer.

In each of these processes, at least one or more of the following advantages are realized: crystallization proceeds rapidly; cooling, transporting, and/or reheating pellets from a pelletizer to a crystallizing vessel is avoided, mechanical rotary mixers are not necessary, the processes are energy efficient because of the high thermal transfer rate to pellets under a hot fluid and no energy is required to transport pellets from a pelletizer to a crystallizer, solid stating may be avoided if desired, and equipment and operating costs are reduced.

DETAILED DESCRIPTION OF THE INVENTION

Figure 1:
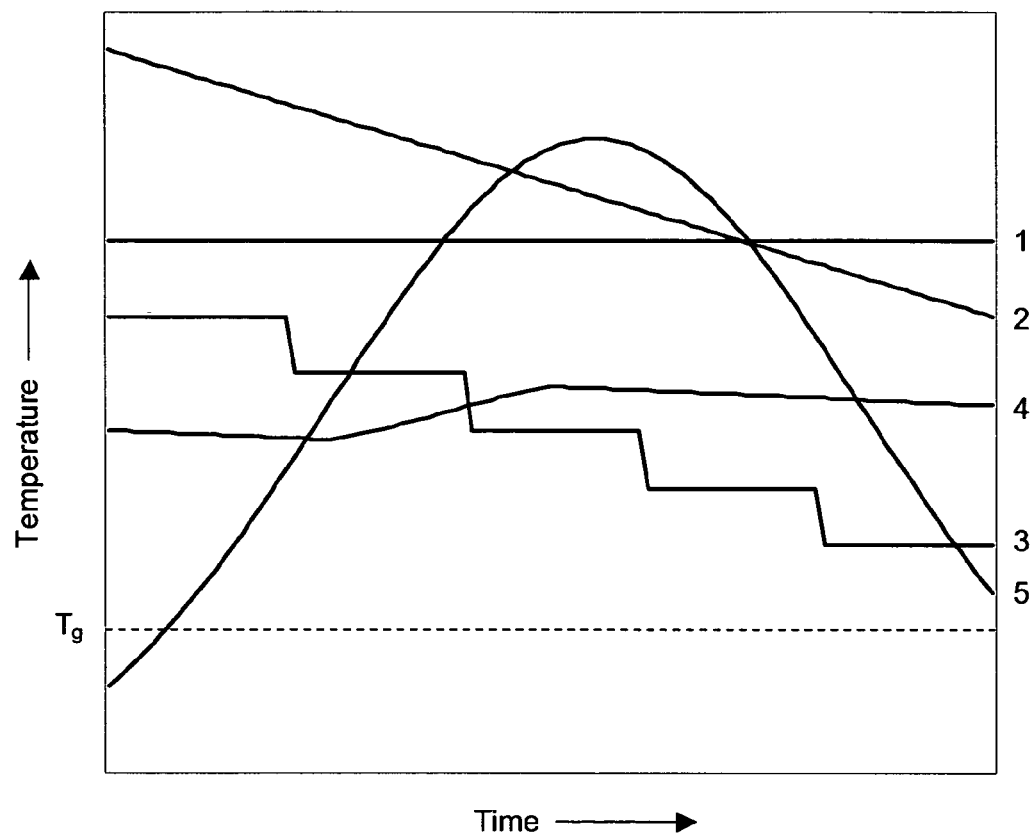
FIG. 1 is a graphical illustration of liquid medium temperature profiles.

The present invention may be understood more readily by reference to the following detailed description of the invention, including the appended figures referred to herein, and the examples provided therein. It is to be understood that this invention is not limited to the specific processes and conditions described, as specific processes and/or process conditions for processing plastic articles as such may, of course, vary.

It must also be noted that, as used in the specification and the appended claims, the singular forms "a," "an" and "the"

include plural referents unless the context clearly dictates otherwise. For example, reference to processing a thermoplastic "preform", "article", "container", or "bottle" is intended to include the processing of a plurality of thermoplastic preforms, articles, containers or bottles. References to a composition containing "an" ingredient or "a" polymer is intended to include other ingredients or other polymers, respectively, in addition to the one named.

Ranges may be expressed herein as from "about" or "approximately" one particular value and/or to "about" or "approximately" another particular value. When such a range is expressed, another embodiment includes from the one particular value and/or to the other particular value.

By "comprising" or "containing" is meant that at least the named compound, element, particle, or method step etc must be present in the composition or article or method, but does not exclude the presence of other compounds, materials, particles, method steps, etc, even if the other such compounds, material, particles, method steps etc. have the same function as what is named.

It is also to be understood that the mention of one or more method steps does not preclude the presence of additional method steps before or after the combined recited steps or intervening method steps between those steps expressly identified.

The intrinsic viscosity values described throughout this description are set forth in dL/g units as calculated from the inherent viscosity measured at 25° C. in 60/40 wt/wt phenol/tetrachloroethane according to the calculations immediately prior to Example 1 below.

The "polyester polymer" of this invention is any thermoplastic polyester polymer in any state or having any shape. Preferably, the polyester polymer contains alkylene terephthalate units or alkylene naphthalate units in an amount of at least 60 mole % based on the total moles of units in the polymer, respectively. The polyester polymer may optionally be isolated as such. The form of the polyester composition is not limited, and includes a melt in the manufacturing process or in the molten state after polymerization, such as may be found in an injection molding machine, and in the form of a liquid, globule, strand, fiber, pellet, preforms, and/or bottle.

A globule is a discrete molten particle having any shape. As a non-limiting illustration, globules are typically produced by subjecting a polyester polymer to a cutting operation, a chopping operation, or any other operation altering the shape of a sheet, strand, or any other die shape. Globules may be distinguished from sheets, films, and fibers.

A polyester pellet is a solid when measured at 25° C. and 1 atm, and under the operating conditions, the polyester polymer is a pellet when the polymer temperature falls and stays below the $T_g$ of the polymer. The shape of the pellet is not limited, and is typified by regular or irregular shaped discrete particles without limitation on their dimensions but may be distinguished from a sheet, film, strand or fiber.

In the process of the invention, a polyester polymer is crystallized by introducing a molten polyester polymer into a liquid medium at a liquid medium temperature greater than the $T_g$ of the polyester polymer A "molten polyester polymer" as used throughout this description is a polyester polymer having obtained a temperature of at least 190° C. and remaining at any temperature above the $T_g$ of the polyester polymer on at least the surface of the polyester polymer until such time as the polyester polymer is introduced into the liquid medium. Preferably, the whole polyester polymer throughout the globule is at a temperature exceeding the $T_g$ of the polymer at the time it is introduced into the liquid medium. Any technique used for measuring the temperature of a polyester polymer which registers above the $T_g$ of the polymer is deemed to necessarily have at least a surface temperature exceeding the $T_g$ of the polymer.

In the first embodiment, the molten polyester polymer is introduced into a liquid medium at a liquid medium temperature greater than the $T_g$ of the polyester polymer. The $T_g$ of the polyester polymer can be measured by a DSC scan according to the following test conditions: about 10 mg of polymer sample is heated from 25° C. to 290° C. at a rate of 20° C./min. in a Mettler DSC821. The sample is held at 290° C. for 1 minute, removed from the DSC furnace and quenched on a room-temperature metal sample tray. Once the instrument has cooled to 25° C. (about 6 mmin.), the sample is returned to the furnace and taken through a second heat from 25° C. to 290° C. at a rate of 20° C./min. The $T_g$ is determined from the second heat. For PET homopolymers and PET modified copolymers, the $T_g$ is usually between about 70° C. and 90° C., depending on the type and degree of modification to the polymer. In this embodiment, at any point in the life time of a polyester polymer and regardless of its thermal history or whether it is virgin, from the melt phase, recycled, scrap, or already had been crystallized at some point, the polymer undergoes a process wherein it is heated to above 190° C. and before the polymer falls below its $T_g$, it is brought into contact with a liquid medium at a temperature above the $T_g$ of the polymer, and preferably at a liquid medium temperature above 100°, more preferably above 130° C., and most preferably at 140° C. or more. The particulars of this embodiment and other embodiments are explained further below.

The method for making the polyester polymer is not limited. Any conventional method appropriate to making a polyester polymer is included. For illustration purposes, without limitation, the following method for making a polyester polymer is suitable.

Examples of suitable polyester polymers include polyalkylene terephthalate homopolymers and copolymers modified with a modifier in an amount of 40 mole % or less, preferably less than 15 mole %, most preferably less than 10 mole % (collectively referred to for brevity as "PAT") and polyalkylene naphthalate homopolymers and copolymers modified with less than 40 mole %, preferably less than 15 mole %, most preferably less than 10 mole %, of a modifier (collectively referred to herein as "PAN"), and blends of PAT and PAN. The preferred polyester polymer is polyalkylene terephthalate, and most preferred is polyethylene terephthalate.

Preferably, the polyester polymer contains at least 60 mole % ethylene terephthalate repeat units, or at least 85 mole %, or at least 90 mole % of each respectively, and most preferably at least 92 mole %, based on the moles of all units in the polyester polymers. Thus, a polyethylene terephthalate polymer may comprise a copolyester of ethylene terephthalate units and other units derived from an alkylene glycol or aryl glycol with an aliphatic or aryl dicarboxylic acid.

A PET polymer. is a polymer obtained by reacting terephthalic acid or a $C_1$–$C_4$ dialkylterephthalate such as dimethylterephthalate, in an amount of at least 60 mole % based on the moles of all dicarboxylic acids and their esters, and ethylene glycol in an amount of at least 60 mole % based on the moles of all diols. It is also preferable that the diacid component is terephthalic acid and the diol component is ethylene glycol. The mole percentage for all the diacid component(s) totals 100 mole %, and the mole percentage for all the diol component(s) totals 100 mole %.

The polyester pellet compositions may include admixtures of polyalkylene terephthalates along with other thermoplastic polymers such as polycarbonate (PC) and polyamides. It is preferred that the polyester composition should comprise a majority of polyalkylene terephthalate polymers or PEN polymers, more preferably in an amount of at least 80 wt. %, most preferably at least 95 wt. %, based on the weight of all thermoplastic polymers (excluding fillers, compounds, inorganic compounds or particles, fibers, impact modifiers, or other polymers which may form a discontinuous phase).

In addition to units derived from terephthalic acid, the acid component of the present polyester may be modified with units derived from one or more additional modifier dicarboxylic acids. Such additional dicarboxylic acids include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples of dicarboxylic acid units useful for modifying the acid component are units from phthalic acid, isophthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid, sebacic acid, and the like, with isophthalic acid, naphthalene-2,6-dicarboxylic acid, and cyclohexanedicarboxylic acid being most preferable. It should be understood that use of the corresponding acid anhydrides, esters, and acid chlorides of these acids is included in the term "dicarboxylic acid". It is also possible for monofunctional, trifunctional, and higher order carboxylic acids to modify the polyester.

In addition to units derived from ethylene glycol, the diol component of the present polyester may be modified with units from additional diols and modifier diols including cycloaliphatic diols preferably having 6 to 20 carbon atoms and aliphatic diols preferably having 3 to 20 carbon atoms. Examples of such diols include diethylene glycol; triethylene glycol; 1,4-cyclohexanedimethanol; propane-1,3-diol; butane-1,4-diol; pentane-1,5-diol; hexane-1,6-diol; 3-methylpentanediol-(2,4); 2-methylpentanediol-(1,4); 2,2,4-trimethylpentane-diol-(1,3); 2,5-ethylhexanediol-(1,3); 2,2-diethyl propane-diol-(1,3); hexanediol-(1,3); 1,4-di-(hydroxyethoxy)-benzene; 2,2-bis-(4-hydroxycyclohexyl)-propane; 2,4-dihydroxy-1,1,3,3-tetramethyl-cyclobutane; 2,2-bis-(3-hydroxyethoxyphenyl)-propane; and 2,2-bis-(4-hydroxypropoxyphenyl)-propane. Typically, polyesters such as polyethylene terephthalate polymer are made by reacting a glycol with a dicarboxylic acid as the free acid or its dimethyl ester to produce an ester monomer, which is then polycondensed to produce the polyester.

The polyester compositions of the invention can be prepared by polymerization procedures known in the art sufficient to effect esterification and polycondensation. Polyester melt phase manufacturing processes include direct condensation of a dicarboxylic acid with the diol, optionally in the presence of esterification catalysts, in the esterification zone, followed by polycondensation in the prepolymer and finishing zones in the presence of a polycondensation catalyst; or ester exchange usually in the presence of a transesterification catalyst in the ester exchange zone, followed by prepolymerization and finishing in the presence of a polycondensation catalyst, and each may optionally be solid stated according to known methods.

To further illustrate, a mixture of one or more dicarboxylic acids, preferably aromatic dicarboxylic acids, or ester forming derivatives thereof, and one or more diols are continuously fed to an esterification reactor operated at a temperature of between about 200° C. and 300° C., typically between 240° C. and 290° C., and at a pressure of between about 1 psig up to about 70 psig. The residence time of the reactants typically ranges from between about one and five hours. Normally, the dicarboxylic acid is directly esterified with diol(s) at elevated pressure and at a temperature of about 240° C. to about 270° C. The esterification reaction is continued until a degree of esterification of at least 60% is achieved, but more typically until a degree of esterification of at least 85% is achieved to make the desired monomer. The esterification monomer reaction is typically uncatalyzed in the direct esterification process and catalyzed in ester exchange processes. Polycondensation catalysts may optionally be added in the esterification zone along with esterification/ester exchange catalysts. Typical ester exchange catalysts which may be used include titanium alkoxides, dibutyl tin dilaurate, used separately or in combination, optionally with zinc, manganese, or magnesium acetates or benzoates and/or other such catalyst materials as are well known to those skilled in the art. Phosphorus containing compounds and cobalt compounds may also be present in the esterification zone. The resulting products formed in the esterification zone include bis(2-hydroxyethyl) terephthalate (BHET) monomer, low molecular weight oligomers, DEG, and water as the condensation by-product, along with other trace impurities formed by the reaction of the catalyst and other compounds such as colorants or the phosphorus containing compounds. The relative amounts of BHET and oligomeric species will vary depending on whether the process is a direct esterification process in which case the amount of oligomeric species are significant and even present as the major species, or a ester exchange process in which case the relative quantity of BHET predominates over the oligomerir species. The water is removed as the esterification reaction proceeds to provide favorable equilibrium conditions. The esterification zone typically produces the monomer and oligomer mixture, if any, continuously in a series of one or more reactors. Alternately, the monomer and oligomer mixture could be produced in one or more batch reactors. It is understood, however, that in a process for making PEN, the reaction mixture will contain monomeric species is bis(2-hydroxyethyl) naphthalate and its corresponding oligomers. Once the ester monomer is made to the desired degree of esterification, it is transported from the esterification reactors in the esterification zone to the polycondensation zone comprised of a prepolymer zone and a finishing zone. Polycondensation reactions are initiated and continued in the melt phase in a prepolymerization zone and finished in the melt phase in a finishing zone, after which the melt is solidified into precursor solids in the form of chips, pellets, or any other shape.

Each zone may comprise a series of one or more distinct reaction vessels operating at different conditions, or the zones may be combined into one reaction vessel using one or more sub-stages operating at different conditions in a single reactor. That is, the prepolymer stage can involve the use of one or more reactors operated continuously, one or more batch reactors, or even one or more reaction steps or sub-stages performed in a single reactor vessel. In some reactor designs, the prepolymerization zone represents the first half of polycondensation in terms of reaction time, while the finishing zone represents the second half of polycondensation. While other reactor designs may adjust the residence time between the prepolymerization zone to the finishing zone at about a 2:1 ratio, a cornmon distinction in many designs between the prepolymerization zone and the finishing zone is that the latter zone frequently operates at a higher temperature and/or lower pressure than the operating conditions in the prepolymerization zone. Generally, each of the prepolymerization and the finishing zones comprise one or a series of more than one reaction vessel, and the prepolymerization and finishing reactors are sequenced in a series as part of a continuous process for the manufacture of the polyester polymer.

In the prepolymerization zone, also known in the industry as the low polymerizer, the low molecular weight monomers and oligomers are polymerized via polycondensation to form polyethylene terephthalate polyester (or PEN polyester) in the presence of a catalyst. If the catalyst was not added in the monomer esterification stage, the catalyst is added at this stage to catalyze the reaction between the monomers and low molecular weight oligomers to form prepolymer and split off the diol as a by-product. If a polycondensation catalyst was added to the esterification zone, it is typically blended with the diol and fed into the esterification reactor. Other compounds such as phosphorus containing compounds, cobalt compounds, and colorants can also be added in the prepolymerization zone or esterification zone. These compounds may, however, be added in the finishing zone instead of or in addition to the prepolymerization zone and esterification zone. In a typical DMT-based process, those skilled in the art recognize that other catalyst material and points of adding the catalyst material and other ingredients vary from a typical direct esterification process.

Typical polycondensation catalysts include the compounds of Sb, Ti, Ge, Zn and Sn in an amount ranging from 0.1 to 500 ppm based on the weight of resulting polyester polymer. A common polymerization catalyst added to the esterification or prepolymerization zone is an antimony-based polymerization catalyst. Suitable antimony based catalyst include antimony (III) and antimony (V) compounds recognized in the art and in particular, diol-soluble antimony (III) and antimony (V) compounds with antimony (III) being most commonly used. Other suitable compounds include those antimony compounds that react with, but are not necessarily soluble in the diols prior to reaction, with examples of such compounds including antimony (III) oxide. Specific examples of suitable antimony catalysts include antimony (III) oxide and antimony (III) acetate, antimony (III) glycolates, antimony (III) ethylene glycoxide and mixtures thereof, with antimony (III) oxide being preferred. The preferred amount of antimony catalyst added is that effective to provide a level of between about 75 and about 400 ppm of antimony by weight of the resulting polyester.

This prepolymer polycondensation stage generally employs a series of one or more vessels and is operated at a temperature of between about 250° C. and 305° C. for a period between about five minutes to four hours. During this stage, the It.V. of the monomers and oligomers is increased up to about no more than 0.45. The diol byproduct is removed from the prepolymer melt using an applied vacuum ranging from 5 to 70 torr to drive the reaction to completion. In this regard, the polymer melt is sometimes agitated to promote the escape of the diol from the polymer melt. As the polymer melt is fed into successive vessels, the molecular weight and thus the intrinsic viscosity of the polymer melt increases. The pressure of each vessel is generally decreased to allow for a greater degree of polymerization in each successive vessel or in each successive zone within a vessel. However, to facilitate removal of glycols, water, alcohols, aldehydes, and other reaction products, the reactors are typically run under a vacuum or purged with an inert gas. Inert gas is any gas which does not cause unwanted reaction or product characteristics at reaction conditions. Suitable gases include, but are not limited to, argon, helium and nitrogen.

Once an It.V. of no greater than 0.45 dL/g is obtained, the prepolymer is fed from the prepolymer zone to a finishing zone where the second half of polycondensation is continued in one or more finishing vessels generally, but not necessarily, ramped up to higher temperatures than present in the prepolymerization zone, to a value within a range of from 270° C. to 305° C. until the It.V. of the melt is increased from the It.V of the melt in the prepolymerization zone (typically 0.30 but usually not more than 0.45 dL/g) to an It.V of at least 0.55 d/g. The industrially practical It.V. generally ranges from about 0.55 to about 1.15 dL/g. The final vessel, generally known in the industry as the "high polymerizer," "finisher," or "polycondenser," is operated at a pressure lower than used in the prepolymerization zone, e.g. within a range of between about 0.2 and 4.0 torr. Although the finishing zone typically involves the same basic chemistry as the prepolymer zone, the fact that the size of the molecules, and thus the viscosity differs, means that the reaction conditions also differ. However, like the prepolymer reactor, each of the finishing vessel(s) is operated under vacuum or inert gas, and each is typically agitated to facilitate the removal of ethylene glycol.

A suitable It.V. from the melt phase can range from 0.55 dl/g to 1.15 dl/g. However, one advantage of the process is that the solid stating step can be avoided. Solid stating is commonly used for increasing the molecular weight (and the It.V) of the pellets in the solid state, usually by at least 0.05 It.V. units, and more typically from 0.1 to 0.5 It.V. units. Therefore, in order to avoid a solid stating step, a preferred It.V. from the melt phase, which can be measured on the amorphous pellets, is at least 0.7 dL/g, or 0.75 dL/g, and up to about 1.2 dL/g, or 1.15 dug.

The molten polymer may be allowed to solidify and/or obtain any degree of crystallinity from the melt phase, then later heated to above 190° C., and brought into contact with the liquid medium. Alternatively, the molten polymer may be pumped directly or indirectly from a melt phase final reactor or vessel into the liquid medium as a molten polyester polymer. If desired, the molten polymer may be obtained from a recycled polyester polymer in flake or pellet form, or from scrap.

The history of the polymer is not limited and the polymer can undergo any history and any state prior to converting the polymer into a molten polymer for introduction into the liquid medium. The method for melting the polyester polymer is not limited. Any conventional melting apparatus can be used. For example, the polyester polymer may be melted by introducing a solid polyester polymer into an extruder, or it can be pumped directly from the melt phase.

The method for introducing the molten polyester into the liquid medium is not limited. For example, in one embodiment, the molten polyester polymer is directed through a die, or merely cut, or both directed through a die followed by cutting the molten polymer. In another example, the polyester polymer may melt extruded with a single or twin screw extruder through a die, optionally at a temperature of 190° C. or more at the extruder nozzle, and cut into globules or extruded into strands or any other die shape. In yet another alternative embodiment, the molten polyester polymer is pumped directly or indirectly from a melt phase finisher vessel with a gear pump, forced through a die and cut into globules or shaped into a strand, sheet or other die shape.

In the invention, the polyester polymer is molten at the time the polymer is introduced into the liquid medium. In any method used to physically transfer the molten polyester from the melt phase reactor or extruder to a liquid medium zone for inducing crystallization, the temperature of the molten polyester polymer does not drop below the $T_g$ of the polymer commencing from the step of converting the molten polymer melt to a shape such as a globule, sheet, strand, etc., to its introduction into the liquid medium at a temperature exceeding the $T_g$ of the polymer. For example, the polyester polymer from the melt phase should not drop below of the $T_g$ of the polymer between the point at which it is cut into globules at the die plate to the point at which it is introduced into a liquid medium at a temperature above the $T_g$ of the polymer. Moreover, the introduction of the molten polyester polymer into a liquid medium temperature exceeding the $T_g$ of the polymer (for convenience referred to herein as the "hot" liquid medium) is not limited to the stated liquid medium temperature when the molten polyester polymer first contacts a liquid medium. For example, the molten polyester polymer may reside in a liquid medium at a liquid medium temperature below the $T_g$ of the polymer followed by its introduction in the same liquid medium at a liquid medium temperature exceeding the $T_g$ of the polymer so long as the molten polyester polymer temperature does not drop below its $T_g$. Thus, the introduction of the polyester polymer is not limited to first contact with a liquid medium, and the polyester polymer may undergo any history including contact with a cool liquid medium provided that when the polyester polymer finally does contact the hot liquid medium, the temperature of the polymer has not fallen below the $T_g$ of the polymer between the time it was melted at 190° C. or above and the time it contacts the hot liquid medium. Examples of this embodiment are described in more detail below.

Also, for convenience, a molten polyester polymer directed through a die and/or cut or otherwise processed into a shape will be referred to as globules. It is understood, however, that the process as described with respect to a "globule" may also be applied to melt crystallize strands, continuous or discontinuous fibers, sheet, and rods.

Prior to introducing the molten polyester polymer into the hot liquid medium, it is preferably cut to a desired shape. It is preferred to cut the molten polyester polymer while the temperature of the polyester polymer is at least 190° C., and more preferably within a range of about 200° C. to 350° C. The polyester polymer melt is optionally filtered to remove particulates over a designated size before being cut. Any conventional hot pelletization or dicing method and apparatus can be used, including but not limited to dicing, strand pelletizing and strand (forced conveyance) pelletizing, pastillators, water ring pelletizers, hot face pelletizers, underwater pelletizers and centrifuged pelletizers. Examples of underwater pelletizers are set forth in U.S. Pat. Nos. 5,059,103, 6,592,350; 6,332,765; 5,611,983; 6551087; 5,059103, 4728,276; 4728,275; 4,500,271; 4,300,877; 4251198; 4123207; 3753637; and 3749539, each of which are fully incorporated herein by reference.

The liquid medium is housed in a liquid medium zone, and the liquid medium zone is at least within a crystallization apparatus. The crystallization process may occur in a batchwise mode or continuously, preferably continuously. The liquid medium zone is any cavity in which the globules contact the liquid medium under conditions effective to induce crystallization. The crystallization apparatus containing a part of the liquid medium zone may also optionally comprise feed inlets, discharge tubes, pumps, probes, metering devices, heat exchangers, die plate(s), cutter(s), and valves. The polymer melt cutter may be located within the liquid medium zone in a manner such that the cutter blades and the die plate are in contact with the liquid medium. In one embodiment, the liquid medium zone comprises and begins with a die plate, a cutter, and a space in a vessel or a pipe, each of which are in contact with the liquid medium, and optionally, the cutter blade contacting the molten polyester polymer exiting the die plate is submerged in the liquid medium. Thus, a flow of liquid medium may be fed to a housing containing the cutter and die plate to provide the flow and motive force to drive the globules from the housing into a pipe or vessel designed to provide the residence time sufficient to crystallize the globules. Crystallization may begin at the moment the molten polymer is cut in the housing to the point at which the globules are separated from the liquid medium. In a typical case, however, the molten polyester polymer has an induction period prior to the onset of crystallization which is dependent upon the liquid medium temperature and the composition of the polymer. In general, at liquid medium temperatures ranging from 130° C. to 200° C., the induction period for a PET polymer ranges from about 15 seconds to 5 minutes.

In an underfluid cutter design, the molten polyester polymer is in contact with the liquid medium at the time the polymer exiting the die plate is cut, thereby instantly submerging the globules into the liquid medium. Preferably, the entire cutting mechanism and the molten polyester polymer are underfluid the point where the molten polymer is cut. By cutting underfluid, the molten polymer is in continuous contact with the liquid medium upon exiting the die and at the point of being cut into globules, which are then swept away in the liquid medium current through piping or to a vessel which provides the necessary residence time to crystallize the globules to the desired degree. In this way, the process of crystallization is continuous for so long as polymer melt is fed through the die plate. Further, by crystallizing molten polyester polymer obtained as a melt from the melt phase, the process is more energy efficient because it is no longer necessary to provide for cooling means to cool the melt into pellets, or to store pellets in hoppers in preparation for feeding to a crystallization vessel, or to transport pellets to such a vessel, and more importantly, it is no longer necessary to reheat the pellets to bring them up to crystallization temperatures. Moreover, using a moving liquid to transport globules through an apparatus such as a pipe is more economical and less capital intensive than the installation and operation of a fluidized bed crystallization vessel, is more energy-efficient, requires less maintenance and generates fewer fines than would be the case using mechanically agitated vessels in conventional crystallizers.

When a die is used, the shape and configuration of the die is not particularly limited. Polymers may be extruded through a strand die or other suitable die, whether single filament, or as is more traditionally done, multiple filaments, or fed directly from the melt reactor through a die using a gear pump. The die plate may have multiple orifices of diameters generally from about 0.05 to 0.15 inch, to the cutter. Usually, a hot, high temperature heat transfer liquid is circulated through the die channels so as to heat the die plate and promote flow of the polymer through the die plate. Electrical or other means of heating are also possible. An example of a die plate assembly for underwater pelletizing is set forth in U.S. Pat. Nos. 6474969; 5,597,586; 4,822,546; 4,470,791; each of which are fully incorporated herein by reference. A water housing is provided within which water is circulated against the other side of the die plate. Optionally, circulating water enters the water housing and into contact against the face of the die plate to cool the polyester polymer melt to a desired temperature above its $T_g$.

After pumping the molten polyester, as by way of an extruder or gear pump or any other conventional pumping means, through the die, the molten polymer is cut, preferably instantly cut, into any desired shape before the polyester polymer cools below its $T_g$, and more preferably cut when the temperature of the molten polyester polymer is within a range of 200° C. to 350° C., or at a temperature ranging from 240° C. to 310C. This temperature can be measured by a inserting a thermal probe into the stream of polyester polymer entering the die plate, and if this is not possible, the extruder nozzle temperature is also a useful indicator of the molten polymer temperature assuming the die plate is not cooled. In the event the die plate is cooled, the temperature of the polymer can be calculated taking into account the nozzle temperature, the heat transfer through the die plate, and cooling temperature in the die.

A rotatable knife flush with the die plate severs the individual streams into globules as the streams exit the orifices. Alternatively, the molten polyester polymer, after being pumped through the die, is cut in close proximity to the die face. In yet another alternative embodiment, the molten polyester polymer is pumped through a die to form strands or other suitable shapes without being cut, brought into contact with the liquid medium such as a water bath at a temperature at least above the $T_g$ of the polyester polymer and for a time sufficient to induce crystallinity to the molten polyester, optionally pulled through the water bath with or without straining the strands, and then subsequently cut into pellets either while the polymer is molten or after it is cooled to below the $T_g$ of the polymer.

In a preferred embodiment, as the globules are formed when the molten polymer is pumped through the orifices and sheared by the knife, the globules contact a liquid medium at a liquid medium temperature sufficient to induce crystallization to the globules. However, if desired, the liquid medium may be at a temperature less than necessary to crystallize the globules ("cool" liquid medium)as the globules contact the liquid medium, provided that the temperature of the globules do not drop below the $T_g$ of the polyester polymer prior to the point at which the temperature of the liquid medium is raised to above the $T_g$ of the polyester polymer. In this case, the globules (or molten polyester polymer if not cut) remain molten in the cool liquid medium and are considered as having been introduced into the hot liquid medium (above the $T_g$ of the polyester polymer) at the point where the globules contact the hot liquid medium in spite of spending time in the cool zone so long as the temperature of the globules does not drop to below its $T_g$ prior to their introduction into the hot liquid medium.

An example of when globules (or uncut molten polyester polymer), may temporarily reside in a cool liquid medium zone before introduction into a hot liquid medium is when the stream of cool water is directed at the die plate of an underfluid pelletizer to reduce the tendency of the globules to stick to each other or the cutting equipment. For example, an underfluid pelletizer surrounded by a housing is fed with hot liquid medium (above the $T_g$ of the polyester polymer) through a feed pipe to the housing. Molten polyester polymer is directed through a die plate and cut into globules at the inner surface (facing the liquid medium) of the die plate by revolving knives on the pelletizer contacting or in close proximity to the inner die plate surface. Preferably, the molten polymer contacts the hot liquid medium as it exits the die plate, and is carried away from the pelletizer after being cut into globules by the flow of liquid medium proceeding from the inlet pipe to and through and outlet pipe to provide the globules with the residence time necessary to induce crystallinity. However, if desired, a flow of cool liquid at a temperature below the $T_g$ of the polyester polymer, preferably below 40° C., more preferably below 30° C., is directed against the inner die plate surface and/or against the cutting blades. The cool liquid medium stream may be directed into and through the flow of hot liquid medium at any angle so long as the cool liquid medium impinges upon the inner surface of the die plate or the cutting blades. The cool liquid medium stream is in immediate contact with and mixes with the flow of hot liquid medium as the hot liquid medium traverses the underfluid pelletizer and the die plate. Thus, on a bulk scale, the average temperature in the housing may not drop below the $T_g$ of the polymer even though on a micro scale, at the die plate orifice where the molten polymer contacts the cutting blade, the temperature of the liquid medium might fall below the $T_g$ of the polymer. The stream of cool liquid medium may be directed through an aimed nozzle so as to reduce the tendency of the molten polymer to agglomerate but at flow rate that does not lower the temperature of the uncut molten polyester polymer or the globules below the $T_g$ of the polymer. By controlling the flow rate of cool liquid medium, the effect on the molten globules with respect to their ability to crystallize from the melt is not significant changed, yet the advantage of reducing agglomeration may be obtained.

In the process of the invention, molten polyester polymer is introduced into a liquid medium at a liquid medium temperature greater than the $T_g$ of the polyester polymer. Not only may the molten polyester polymer reside for a time in cool liquid medium followed by its introduction into the hot liquid medium before the temperature of the polymer falls below its $T_g$ by way of directing a cool stream of liquid against the die plate/cutting blades, alternatively or in addition thereto, the temperature of the liquid medium in the inlet pipe, or where the molten polyester polymer or globules first contact the liquid medium, should preferably be set below the desired crystallization temperature. It is contemplated that in many instances the polyester polymer will be directed through the die close to or at the nozzle temperature of the melt extruder, or if directed from the melt phase, directed through the die at a temperature likely to exceed 190° C. At these polymer temperatures, the temperature of the incoming liquid medium may be kept lower than the desired crystallization temperature to compensate for the sensible heat transfer from the molten polyester polymer and globules and the heat of crystallization generated during crystallization, each of which raise the liquid medium temperature. Thus, the process of the invention takes advantage of using the heat energy in the molten polymer to heat the liquid medium feed to the molten polymer. The use of preheaters or heat exchangers in a closed system wherein the liquid medium is recycled back to the die plate/pelletizer can be avoided altogether, or if used, the energy consumption is reduced. The liquid medium temperature, at a point before the molten polyester polymer temperature falls below its $T_g$, is at least above the $T_g$ of the polyester polymer, and suitably below the the high melting point of the polyester polymer, beyond which crystallization is not possible. In one embodiment, the temperature of the liquid medium ranges from 100° C. to 200° C., more preferably between about 140 to 180° C. to optimize the balance between the residence time needed to obtain a final desired degree of crystallinity, the hydrolysis or glycolysis of the polyester polymer in the liquid medium, the desired degree of crystallization, and the energy consumption.

As illustrated in FIG. 1, the liquid medium temperature may be held constant throughout the time during which crystallization is induced to the time the globules are separated from the fluid (curve 1), or it may vary over time in a constant or linear descent (curve 2), or a stepwise descent (curve 3), or it may be fairly constant until the heat of crystallization raises the liquid medium temperature after which the liquid medium temperature may be held constant or gradually descend (curve 4), or the temperature profile may in a bell shaped curve with the peak crystallization temperature occurring at some point in time between initiating crystallization to terminating crystallization (curve 5). The molten polyester polymer is considered crystallized when a measure of crystallinity is induced at least on or in any portion of the molten polyester polymer, such as on the surface of a globule, or throughout any portion of a cross-section cut of the resulting pellet. The desired degree of crystallization will vary depending on the application and the severity of service requirement, but for most applications, a degree of crystallinity above 15% is desirable, and more commonly, the degree of crystallization is above 20%, and even above 25%, and typically below about 60%, although the process of the invention is capable of substantially if not completely crystallizing the polyester polymer. The distribution of thermally induced crystalline spherulites throughout the polymer is not limited. Crystalline regions may appear on only on the surface, or randomly distributed through the polymer. The degree of crystallization of a polyester polymer can be measured taking a sample of the polymer at the conclusion of crystallization as a solid pellet and measured using either a gradient tube density method or the DSC method referenced in the Examples. The DSC method is sensitive to the quality of the baseline applied to the peaks prior to integration of the area under the peaks. The density method is sensitive to the quality of the pellets tested. However, both test methods correlate well to each other at higher degrees of crystallization above 25%. The solid crystallized pellet is deemed to have a minimum degree of crystallization value if either of the test methods is positive for that value or greater.

The particular liquid medium used is not limited. A liquid medium composition which causes an undesirable high loss in It.V. under all operating conditions should be avoided. The tolerance to It.V. losses will vary according to the demands of the end user of the pellets or of the application into which the pellets will be used. Examples of liquids which are suitable for use in the process include water; polyalkylene glycols such as diethylene glycol and triethylene glycol; and alcohols. In addition to the continuous operating adjustments that can be made to the vessel pressure and the temperature holding the liquid medium as discussed further below, the residence time, degree of crystallization, and energy efficiency of the process can also be controlled by the optimal selection of the heating medium.

It is desired to use liquids that have a high heat capacity to optimize heat transfer to the pellets at the lowest possible residence time. Liquids which have low vapor pressures are also desirable to further reduce equipment costs since a vessel with a lower pressure rating can be used. However, a significant and sometimes overriding factor to consider in the selection of the liquid is the ease with which the liquid is separated from the pellets, the ease with which the liquid is volatized from the inside of the pellet, and the costs associated with handling, heating and recirculating the separated liquid back to contact a fresh feed of molten polyester polymer.

The heat capacity of water, 1 cal/g/° C., is attractive and the ease with which water is separated from the pellets and volatized from the pellets is excellent. The vapor pressure of water is about 24 torr at room temperature, 760 torr at 100° C., 2706 torr at 140° C., 7505 torr at 180° C.

Polyalkylene glycols, such as diethylene glycol and triethylene glycol, have a lower vapor pressure than water. The temperature of a liquid medium of polyalkylene glycols can be set higher than water at the same pressure to reduce the residence time of the pellets in the liquid medium, or to reduce the pressure inside the liquid medium zone at the same temperature used for heating water. Due to their lower vapor pressure, devolatizing glycols from the pellets is more energy intensive than water. However, both water and glycols are suitable and the preferred liquids for use as the liquid medium.

If desired, a mixture of water with other liquids which depress the vapor pressure of the liquid medium can be used. For example, water can be mixed with other glycols in an amount not exceeding the solubility of the glycols in water under the operating conditions in the liquid medium zone. It is preferred to use liquids which are water soluble so that excess liquid can be removed from the pellets by water washing.

In one embodiment, the liquid medium has a boiling point at 1 atmosphere which is less than the temperature of the liquid medium contacting the molten polyester. And conversely, the temperature of the liquid medium in contact with the molten polyester polymer is higher than the boiling point of the liquid medium at 1 atmosphere.

The pressure on the liquid medium is equal to or higher than the vapor pressure of the liquid medium in order to prevent the liquid medium from vaporizing. The globules should reside in the hot liquid medium under a pressure sufficiently high to keep the liquid medium in a vapor/liquid equilibrium or completely in the liquid state. Since each liquid composition has a different vapor pressure, the particular minimum pressure on the liquid medium at a given temperature will also vary with the composition of the liquid medium. The pressure may be induced by way of injecting a high pressure inert gas such as nitrogen, or air, any other suitable gas, or by pumping a greater amount of liquid medium into the liquid medium zone. Alternatively, the liquid medium may be heated and vaporized to form the necessary pressure to keep the vapor and liquid in equilibrium in a closed system. Or, a combination of these pressure inducing means may be used.

The vapor pressure of a liquid is normally determined experimentally from the pressure exerted by its vapor when the liquid and vapor are in dynamic equilibrium. However, it is possible in actual practice that that the liquid and vapor in the liquid medium zone may not be in equilibrium at any single point in time or location within the fluid because of variations in pressure from perturbations in the system well known to those skilled in the art, such as pressure differentials across piping, valves, weirs, etc. and non-uniform heating. As a result, it is possible that less static pressure on the liquid is needed to keep the liquid medium from boiling compared to the static pressure needed to keep that same liquid from boiling in a closed system in dynamic equilibrium. Accordingly, the pressure within the liquid medium zone is also deemed to be at or above the vapor pressure of the liquid medium if the liquid medium does not boil, even though the actual static pressure in the liquid medium zone may be slightly less than the theoretical pressure needed to exceed the dynamic vapor pressure of the liquid medium.

The pressure in the liquid medium zone can be controlled to allow for adjustments in the crystallization temperature, thereby also controlling the residence time of the globules in the liquid medium. Using water as an example, its boiling point at 52 psia is 140° C., and at 69 psia is 150° C., 115 psia at 170° C., 145 psia at 180° C. Accordingly, the pressure can be set high to increase the boiling point of water and decrease the residence time of the globules in the hot liquid medium. Pressures of 25, 100, 150, and 200 psia are contemplated as suitable for most applications.

The liquid medium may be static so as to allow the molten shaped polymer to be pulled through the liquid medium (as in the case of strands) or to allow globules to fall through the liquid medium for the desired residence time to induce the desired degree of crystallization. Alternatively, the liquid medium may have a flow to carry the globules to a desired destination, or if not to carry the globules, at least to impart sufficient flow or turbulence to keep the globules from sticking to each other.

Preferably, the liquid medium has a flow, and the flow rate and type of flow is set to submerge the globules. The particular flow rate will depend on the liquid medium zone volume and the globule feed rate. A globule is considered submerged in the liquid medium when the liquid medium envelops the entire globule. However, the globules are considered submerged if the bulk of the globules are enveloped in the fluid at any point during crystallization of the globules, even though some if not all globules at any one point in time are temporarily on or above the surface of the liquid medium, which may occur in a turbulent environment. Preferably, the globules are submerged over substantially the entire time the globules are crystallized.

The residence time is desirably short to limit the cycle time, reduce the equipment cost, and to minimize It.V. loss. The residence time is the time lapse which the polyester polymer experiences commencing from the introduction of the globule into the hot liquid medium (above the $T_g$ of the polymer) to either the time when the temperature of the polyester polymer drops and stays below the $T_g$ of the polyester polymer or when the polyester polymer is removed from the liquid medium, whichever is shorter. In a preferred embodiment, the residence time is not so long as to substantially increase the It.V. (which can be correlated to the weight average molecular weight) of the polyester polymer. Although the process of the invention allows one to keep the globules in contact with the hot liquid medium for a time sufficient to increase the It.V. of the pellets, it is more preferred to reduce the residence time to that necessary to impart the desired degree of crystallization to the polymer, and as noted below, if one starts the crystallization of a polymer having a high It.V. from the melt, a solid stating step can be altogether avoided.

The residence time of the globules in the liquid medium is not limited. However, an advantage of the process allows one to shorten the residence time to 15 minutes or less to impart to the globule a degree of crystallinity of 20% or more, or 25% or more, 30% or more, and even up to 40% or more as measured in the resulting pellet taken immediately after its separation from the liquid medium. For most applications, a degree of crystallinity ranging from 25% to 45% is suitable. The residence time can even be as low as more than 0 seconds to 10 minutes depending upon the crystallization temperature. At temperatures ranging from 140° C. to 180° C., the crystallization time to obtain a degree of crystallinity of 25% or more and even 30% or more ranges from greater than 0 seconds to about 8 minutes or less.

In a more preferred embodiment, crystallization is conducted in the absence of rotating mechanically induced agitation in the liquid medium zone. Horizontal liquid filled, rotating paddle agitated vessels are known to provide the necessary motion to prevent pellets from agglomerating during crystallization. In this embodiment, however, capital and operating costs are reduced by avoiding rotating mechanically induced agitation during crystallization while also avoiding agglomeration. This may be accomplished in several ways. Globules fed into a non-horizontally oriented liquid medium zone filled or nearly filled with a liquid are allowed to settle through the fluid toward the bottom of the vessel while providing the globules and optionally resulting pellets with the buoyancy and necessary residence time through an upflow of liquid medium and/or by controlling the density difference between the pellets and the liquid medium. Alternatively, the globules may be fed through a pipe acting as a liquid medium zone under a flow of fluid to keep the globules moving through the pipe. Desirably, the flow rate and type of flow of liquid through the pipe prevents or contributes toward the prevention of globule agglomeration or sticking to the pipe walls.

In one embodiment, the use of costly pressure rated crystallization tanks may be avoided by crystallizing globules in a pipe. The globules may be crystallized in a pipe by directing a flow of globules in a liquid medium through a pipe having an aspect ratio L/D of at least 15:1, wherein the globules are crystallized in said pipe at a liquid medium temperature greater than the $T_g$ of the polyester polymer. A pipe may be distinguished from conventional vessels in that a pipe has an aspect ratio of length to diameter of greater than 15:1, preferably greater than 25:1, more preferably greater than 50:1. The length of the pipe having an aspect ratio of at least 15:1 is inclusive of a series of pipes joined by couplings, elbows, u-turn, bends, etc.

In a pipe design, the liquid medium temperature is suitably about 90° C. or more, preferably 100° C. or more, more preferably 130° C. or more, and most preferably 140° C. or more. It is also desirable to pressurize the pipe at or above the vapor pressure of the liquid medium.

The pipe may be designed to provide partial or incomplete crystallization, or to finish off crystallization. The degree of crystallization imparted to the globules in the pipe is preferably at least a 20%, more preferably to at least 30%, and most preferably at least 40%. The globules can be crystallized to 25% or more at a residence time of 15 minutes or less, or 10 minutes or less, and even 7 minutes or less. In one embodiment, the globules are crystallized in the pipe to a degree of crystallization of 30% or more within 10 minutes or less.

The pipe is preferably devoid of internal devices such as mechanically rotating paddles, and more preferably is devoid of in-line mixers, weirs, or baffles, and the flow of the liquid medium is desirably in the same direction as the flow of the pellets. The pipe may be filled with a slurry of liquid medium and globules. Alternatively, the pipe may be filled with a vapor, the liquid medium and the globules. The pipe may be oriented horizontally, sloped down to allow gravity to assist the flow of globules, oriented upward against gravitational forces and in an upflow of high pressure fluid to induce a high degree of turbulence, or a combination of these features. The flow through the pipe will comprise molten and/or crystalline polymer, liquid, and optionally vapor flow.

Significant sticking of the globules to each other in the pipe or to the pipe may be avoided even in the absence of rotating mechanically induced agitation by creating a continuous flow of pellets through the pipe. The liquid velocity should be adjusted to reduce pellet agglomeration in the pipe. While sporadic or minor agglomeration may occur in in the pipe, the frequency or number of globules agglomerating does not interfere with the dewatering equipment, and the globules or pellets ejected from such equipment are discrete.

A liquid flow velocity of 1 ft/s or more is suitable to provide a continuous flow of globules in the pipe while reducing the tendency of the globules to roll along the pipe walls in mass and stick to each other. At a residence time ranging from 30 seconds to 20 minutes, the pipe length and diameter may range from 30 ft to 9600 ft at a diameter ranging from 1 inch to 14 inches with a liquid medium velocity ranging from 1 ft/s to 8 ft/s. Other pipe lengths and diameters are suitable as well, and the optimal pipe design will depend upon balancing such factors as the cost of pipe based on its length, diameter, material of construction and pressure rating, the energy required to pump the liquid medium, the thermal energy applied to crystallize at a desired temperature, the polymer IV loss, and the desired residence time.

Once the globules have been crystallized to the desired degree, the globules or the resulting pellets are separated from the liquid medium. The globules may be separated as such from the liquid medium because at temperatures ranging from 100° C. to 180° C., the globules, once crystallized, have sufficient strength and rigidity and are under sufficient pressure on discharge to avoid unduly clogging the separation equipment or sticking to each other during or after separation. Alternatively, prior to separation, the globules may be allowed to cool to a temperature below their sticking point, or to a temperature below the $T_g$ of the polymer to form pellets in order ease the task of separating the liquid from the polymer. Allowing the polymer to cool to form pellets prior to separation reduces the risk of the polymer sticking to the separation equipment or to other polymer particles.

Thus, as noted above in FIG. 1, the liquid medium may follow a slow or stepwise temperature reduction to below the $T_g$ of the polymer. This may be accomplished by injecting a cooler flow of liquid into a stage in the liquid medium zone when the desired degree of crystallization is reached or substantially reached, or by depressurizing the liquid medium zone at one or more stages during the time the polymer resides in the liquid as may occur by discharging the slurry into a let down tank optionally sealed with the discharge outlet, and allowing the globules to settle and cool in the lower pressure environment, or optionally a combination of both such as relieving the pressure on the liquid medium while introducing a cool water feed into the hot liquid medium or into a let down tank. For example, a cold feed of liquid such as water may be introduced into the let down tank at atmospheric pressure to convert the globules into pellets, followed by separating the liquid from the pellets.

However, since it is desirable to conserve the heat energy in the liquid medium and re-circulate the hot liquid medium back to the cutter/die plate, it is more preferred to separate the liquid medium from the polymer while the liquid medium temperature is above the $T_g$ of the polymer and avoid or reduce the tendency of the globules to stick to each other during separation by keeping the globules immersed in the liquid medium during the dewatering operation. Immediately after separating the globules and/or pellets from the liquid medium, if necessary, a cool stream of liquid may be directed at the globules/pellets to further cool the globules/pellets and prevent them from sticking to each other. While the globules and/or pellets separated from the liquid medium will continue to retain at least surface moisture if not some amount of water within the interstices of the globules/pellets, this amount of liquid may be insufficient in some cases to completely and consistently avoid agglomerating the globules/pellets to each other, especially if it is globules at a high temperature which are discharged. Thus, in another embodiment of the invention, if desired, a stream of liquid at a temperature cooler than the globules and/or pellets separated from the liquid medium are directed to the discharged globules/pellets to reduce their temperature and provide some lubricity, thereby reducing their tendency to agglomerate. It is preferred to introduce only a small flow of cool liquid to avoid having to vaporize large quantities of liquid in a subsequent dryer.

The dewatering of pellets (the process of separating the liquid medium from the globules or pellets in any liquid medium composition) can take place in the liquid medium zone, or the slurry can be discharged from the liquid medium zone and transported to a device for separating the pellets from the liquid under pressure if needed. If the liquid medium is depressurized, the temperature, head pressure, and pressure drop across the dewatering equipment should preferably be set to minimize losing the liquid medium due to flashing and thereby avoid energy loss and/or adding costly condensers. It is also preferred to dewater starting from a pressure close to the liquid medium zone pressure to reduce the residence time of the slurry after completion of crystallization and before dewatering. While the pressure on the slurry prior to dewatering is preferably greater than 1 atmosphere, in a more preferred embodiment, the pressure on the slurry prior to dewatering is at least 70%, more preferably at least 80%, and most preferably at least 90% of the pressure in the liquid medium zone in order to reduce the cycle time, avoid the use of cooling equipment, and/or avoid losing part of the liquid medium due to flashing.

The exact starting static pressure on the liquid medium and pellets (slurry) prior to dewatering is dependent upon the temperature, capital considerations, and other factors. During or after dewatering, however, the design pressure drop on the pellets will also depend on the polymer properties of the pellet to ensure that the pellet is sufficiently porous and/or rigid to maintain its structural integrity upon rapid depressurization. Those of skill understand that certain polyester polymers, such as polyethylene naphthalate, either absorb water quickly or do not allow the rapid escape of water entrained in the pellet structure or both, so that a rapid depressurization results in popcoming or other deformities. Thus, the process is designed to avoid pressure drops on the globules or pellets which result deforming the globule or pellet.

Suitable devices to continuously separate the globules or pellets from the liquid medium in closed system under a pressure at or above the vapor pressure of the liquid medium include rotary valves or a set of dual knife-gate valves or any other device which substantially retains the pressure within the liquid medium zone while allowing the globules or pellets to separate from the liquid medium.

Subsequent to their separation, the remaining surface moisture or liquid medium within the intersitices of the globules or pellets can be removed by drying the globules or pellets in any conventional dryer. As noted above, a stream of cool liquid may be directed at the discharged globules or pellets prior to feeding them to the dryer to reduce their temperature and reduce the tendency for agglomeration.

The It.V. of the polyester polymer melt is not particularly limited. A suitable It.V. ranges from 0.55 to 1.15. High It.V. pellets in the range of 0.7 to 1.15 may be crystallized while avoiding the costly step of solid stating. In a conventional process, 0.5 to about 0.69 It.V. pellets are crystallized in two fluidized beds using a countercurrent flow of air, followed by annealing in third vessel using nitrogen gas and then fed to separate vessel at higher temperatures and lower gas flow rate (nitrogen) than used in the crystallization zone to further polycondense the pellets in the solid state and thereby increase their weight-average molecular weight and corresponding It.V. to about 0.7 to 1.15, which is a costly process. In the process of the invention, high It.V. pellets in the range of 0.7 to 1.15 may be crystallized while avoiding the costly step of solid stating. Thus, in one embodiment of the invention, a molten polyester polymer having an It.V. of 0.70 or more is brought into contact with a liquid medium for a time and at a liquid medium temperature sufficient to induce crystallinity to the molten polyester polymer, allowing the molten crystallized polymer to cool to a pellet, and isolating the pellet without increasing the molecular weight of the pellet in the solid state. By solid stating is meant any process, during or after crystallization and before the drying step is conducted immediately prior to introducing pellets into a melt extruder, which increases the molecular weight of pellets in the solid state. Thus, the process provides crystallized high It.V. pellets made by crystallizing polyester polymer from the melt without having to further increase the molecular weight of the polyester polymer in the solid state prior to introducing the crystallized pellets into a injection molding machine or other extrusion machine for making preforms, sheet or other articles.

The invention can be further understood by reference to one or more of the Figures and their description, each serving to illustrate one of the many embodiments within the scope of the invention. Other embodiments within the scope of the invention can be designed by reference to the description without departing from the spirit or scope of the invention.

Figure 2:
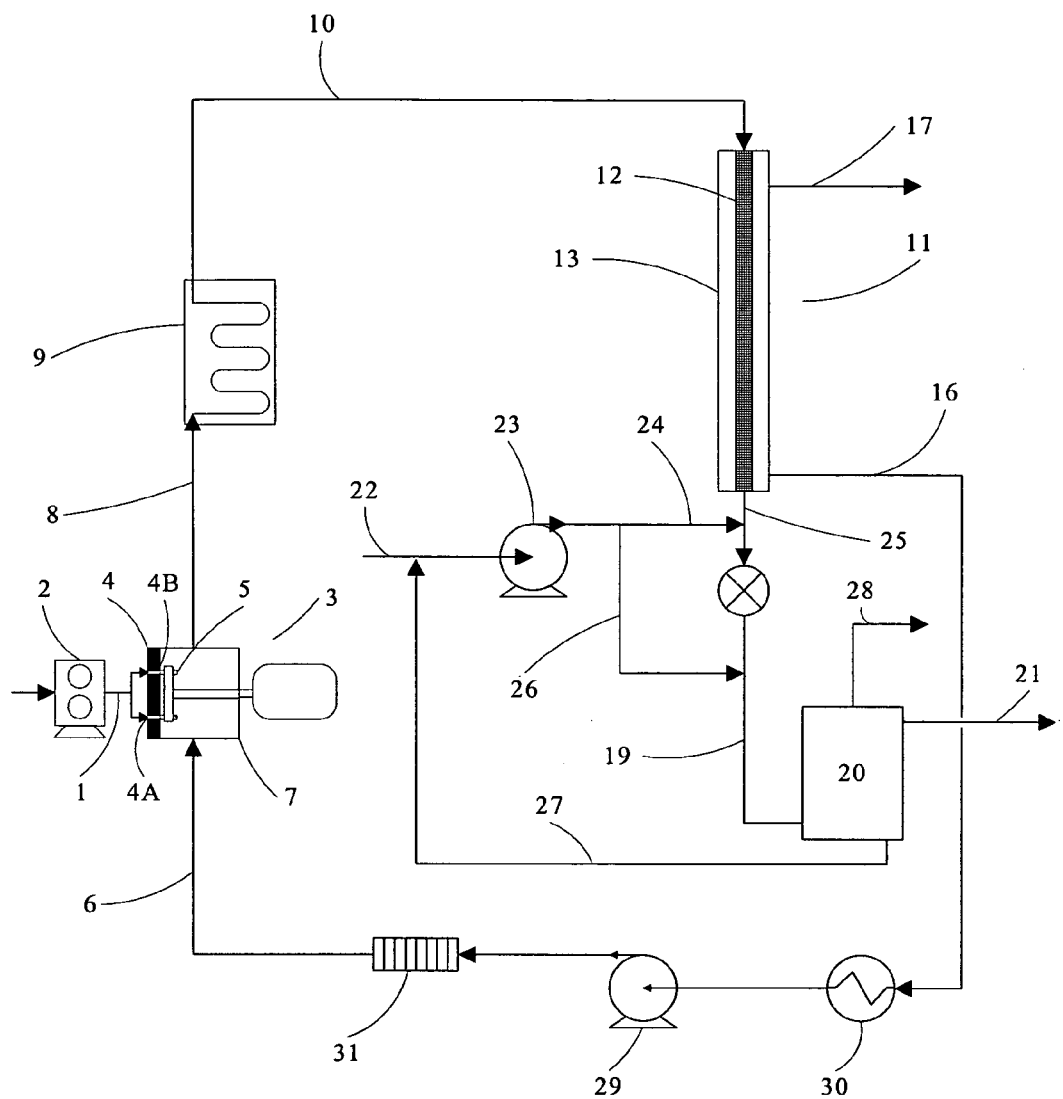
FIG. 2 is a process flow diagram for making crystallized polyester polymer from the melt.
Figure 3:
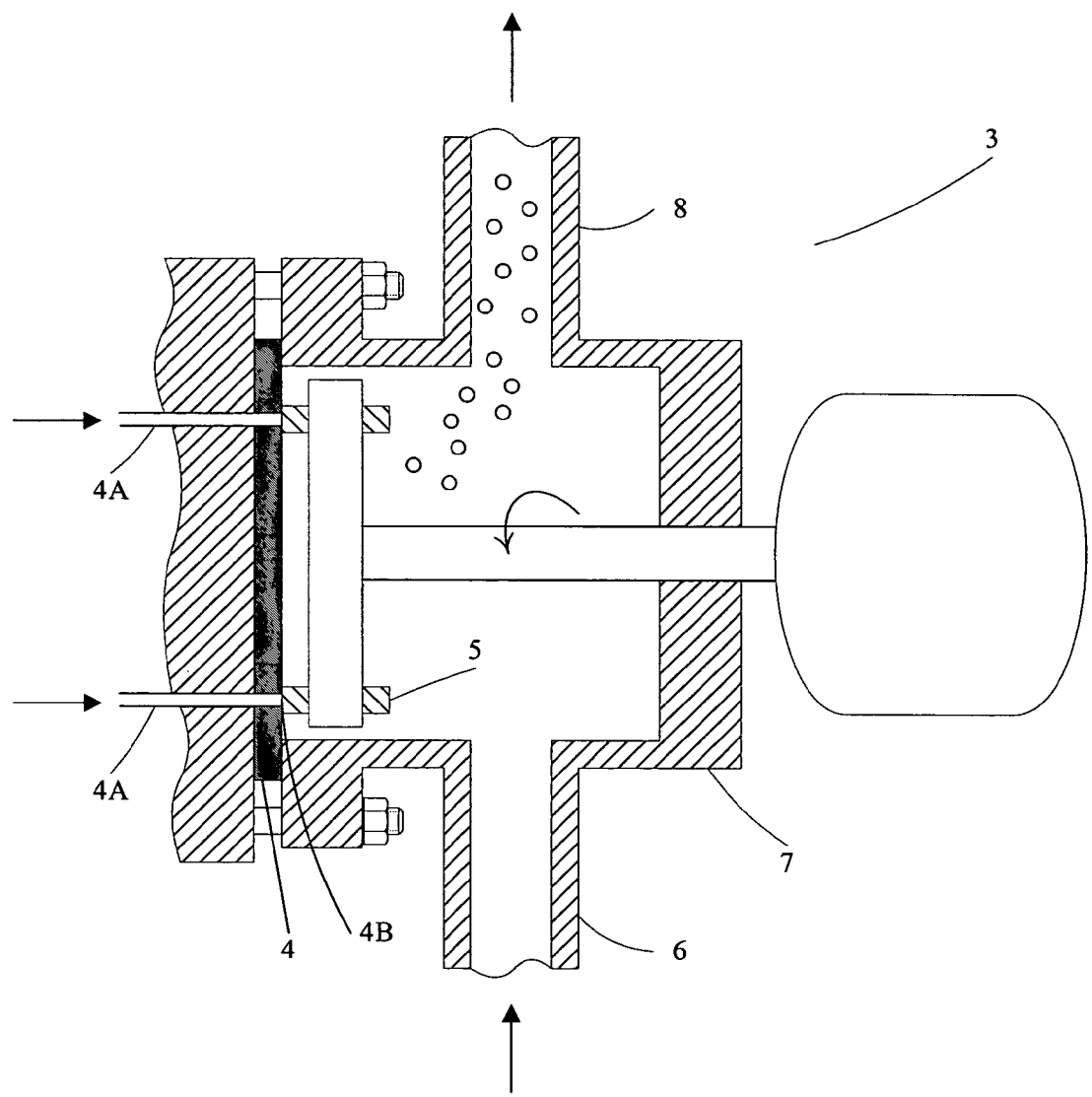
FIG. 3 illustrates an underwater cutting assembly and process.

As illustrated in FIG. 2, a molten polyester polymer stream is fed to an underfluid cutter 3 through line 1 using a gear pump 2 as the motive force. A more detailed view of the underwater cutter is illustrated in FIG. 3, with coinciding reference numerals in FIGS. 2 and 3 referring to the same equipment and process.

The source of the molten polymer may be from pellets fed through an extruder to the gear pump 2 or from the melt phase high polymerizer or frnisher (not shown) fed to the gear pump 2. The molten polymer is directed through orifices 4A on a die plate 4 and cut with cutting blades 5 as the polymer exits the orifices. The cutting blades 5 and the inner surface 4B of the die plate 4 are in contact with a liquid medium fed through a feed pipe 6 into the housing 7 containing the cutting blade 5 and into which is mounted the die plate 4. A suitable liquid medium comprises water entering the housing at a fluid velocity of 1 ft/s to 8 ft/s, preferably 1 ft/s to 4 ft/s. As shown in FIG. 3, the flow of liquid medium through the housing 7 sweeps the cut globules away from the cutter and into the outlet pipe 8 for transport, as shown in FIG. 2, into a crystallizer 9 comprises of a series of pipes in a coil or stacked to form a three dimensional box or any other shape, including a long linear tube. The water temperature at the outlet pipe 8 and through the crystallizer pipes 9 is above the $T_g$ of the polyester polymer globules, and preferably at any temperature within a range of greater than 100° C. to 190° C., and more preferably from 140 to 180° C. At these temperatures, the pressure within the pressurized loop system comprised of crystallizer pipes 8 and 9, separator 11, pipes 10, 16, 6 and housing 7, ranges from 10 psia to 300 psia using water as the liquid medium. The cumulative piping dimensions in piping 8, 9, 10, and the separator 11 may range 120 to 9600 ft in length, at a diameter ranging from 2 to 8 inches in the piping 8, 9, and 10. After flowing through the crystallization pipes for about 30 seconds to 10 minutes, preferably from about 30 seconds to 6 or 7 minutes, the globules are fed through pipe 10 to a globule/water separator 11 comprised of a columnar screen 12 situated within the annulus of a tube 13.

Figure 4:
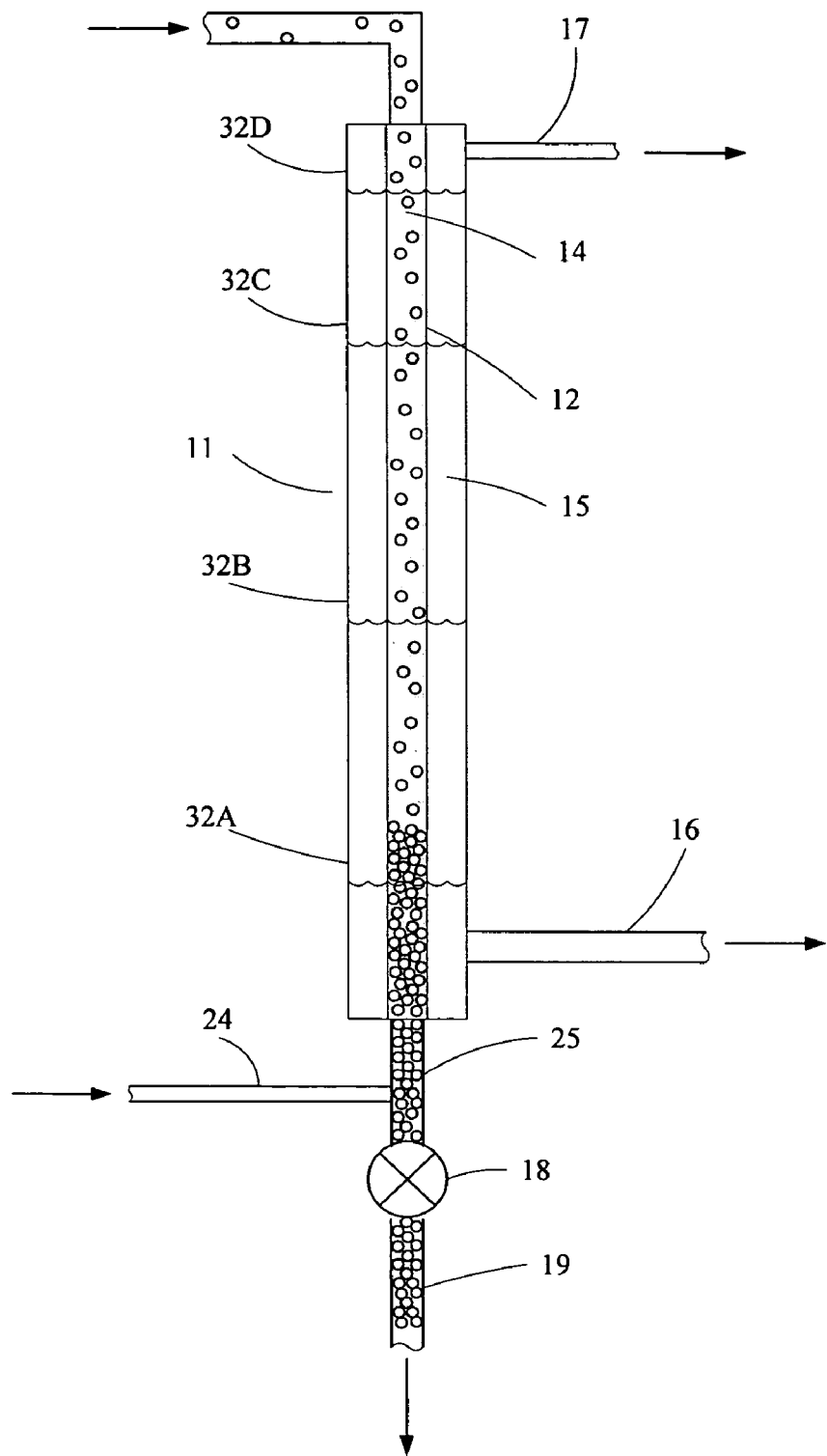
FIG. 4 illustrates an globule/liquid separation apparatus.

A more detailed illustration of a globule/liquid medium separator is shown in FIG. 4. The separator 11 is a pipe or tank (column is illustrated). The separator may be a pipe having the above described aspect ratio, or a tank. The separator is fed with globules and water through an inlet pipe 10 at the top of the separator into the inner annulus 14 within a columnar mesh 12 disposed within the separator 11 to form an outer annulus 15. The separator 11 may be partially or fully filled with water. If desired, the separator 11 may be filled with water below the line of globule accumulation 32A, or at least 50% full 32B, or at least 80% full 32C, or at least 90% 32D full of water. The temperature of the water in the separator is not particularly limited because by the time the globules reach the separator, they may already have been crystallized to the desired degree, in which case the water temperature in the separator can less than the $T_g$ of the polymer, or the residence time of the globules in the separator can be calculated as part of the crystallization time such that crystallization continues in the separator, in which case the water temperature is above the $T_g$ of the polymer. Given that the separator can be as simple as a pipe or tube, the separator can be considered the last leg of a crystallizer 9, but is broken out in FIGS. 2 and 4 for ease of viewing. Thus, the water temperature in the separator can be substantially the same as the average water temperature between the housing 7 and the separator 11.

As the slurry of globules and water is fed into the inner annulus 14, the globules fall by gravity toward the bottom of the separator 11 and remain within the annulus while a portion of the liquid medium is forced out from the inner annulus 14 through the mesh 12 into the outer annulus 15 as the globules descend toward the bottom of the separator 11 and as they begin to accumulate. The liquid medium in the separator 11 is continuously discharged through the separator liquid medium outlet pipe 16. The location of the outlet pipe can be anywhere on the separator 11, and is conveniently located toward the bottom of the separator 11 to promote a top to bottom flow and a consistent temperature profile throughout. The pressure within the vessel may be regulated through a pressure line 17 serving as a pressure relief or a pressurizing mechanism that further aids in regulating the temperature of the water within the separator. The location of pressure line 17, although illustrated here at the top of separator 11, can be anywhere in the pressurized loop of the process, including from the outlet pipe 16.

As the globules descend within the mesh 12, they may accumulate in the inner annulus 14 toward the bottom awaiting discharge from the separator. The level of globule accumulation will depend upon the rate at which the globules are charged and discharged from the separator, and the discharge rate is preferably controlled to maintain a constant level. Any known technique and equipment for discharging solids from a vessel under pressure can be used. The globules may be discharged from the separator into pipe 25 and through a rotary valve 18 as illustrated, or optionally through a set of dual knife gate valves, each of which substantially retain the pressure within the. separator 11 while simultaneously discharging the globules into pipe 19.

The pressure within the separator 11 can be any pressure, but is preferably above the vapor pressure of the liquid medium used, in this case water, to avoid water losses, e.g. greater than 14.9 psia to 300 psia. The pressure in the separator may be substantially the same as the pressure in pipes 8 and 9. However, in the event that the source of cool water is needed as described in some optional embodiments below or a source of cool water is needed to reduce the temperature of the water in line 16 recirculated back to the housing 7, then line pressure relief line 17 or an additional line may be used to vent vaporized water in a gas space above the liquid in the separator if the separator is not completely flooded, or if it is completely filled with water, then a line may be used to drain a small portion of the hot water and vented to atmospheric pressure in a holding tank used as a cooler water source.

Turning back to FIG. 2, globules discharged from separator 11 are fed through pipes 25 and 19 to a conventional dryer 20 to remove any residual moisture on and around the globules, such as surface moisture, moisture within the globules, and residual water between the globule interstices. By this time the globules will have further cooled, and may, if desired, be cooled to below the $T_g$ of the polymer so as to become crystallized pellets upon discharge from the dryer 20 into globule/pellet outlet pipe 21. While reference has been made to globules in the separator, it is to be understood that at any point after the molten polymer contacts the hot water in the housing 7, the globules are crystallized and may thereafter have become a pellet by cooling to below the $T_g$ of the polyester polymer. However, if desired, the temperature of the polyester polymer can be maintained above the $T_g$ of the polymer throughout the process and even upon and after discharge from the dryer 20, which may be desirable if further processing of the polymer requiring a higher temperature is to be used. Since the liquid medium is preferably pressurized in a closed loop, and given that the heat energy in the molten polymer is transferred to the water, and in the interest of optimizing energy utilization, the globules desirably remain as such at least until their entry into the separator 11, and more preferably at least to the point of discharge from separator 11 into pipe 19, after which they may optionally rapidly cool to below their $T_g$ having been separated from the bulk hot water.

In the dryer, residual water which is not evaporated is removed through line 27 and optionally but preferably fed together with water source 22 into pumping means 23. Pellets exiting separator 11 are fed to the rotary valve 18, and in an optional embodiment, a stream of cool water in line 24 from a water source 22 at a temperature below the temperature of the hot liquid medium in the separator 11 and pressurized by a pumping means 23 is injected into the bottom of the inner annulus 14 at the bottom of the separator 11 before the globules are fed to the rotary valve 18. For example, the stream of cool water may be injected into a separator globule discharge line 25 between the separator 11 and the rotary valve 18 at a flow rate sufficient to flow countercurrent to the direction of globule travel in the pipe 25 and up into the inner annulus to cool the globules accumulated at the bottom of the separator and further reduce their tendency to agglomerate before separation at the rotary valve 18. Alternatively, the cool water stream 24 may be injected into line at a flow rate insufficient to flow countercurrent to the travel of the globules, thereby becoming entrained in the globule flow to the rotary valve 18. In either case, by injecting a flow of cool water into line 25, the hot water in the interstices between the globules is displaced before undergoing pressure reduction through rotary valve 18, thereby improving the energy balance and avoid flashing the water. An optimal flow rate for the cool water stream is one which is effective to separate a greater amount of the hot water relative to the amount of hot water separated in the absence of a flow of cool water. The flow rate of the cool water stream can be adjusted to prevent most of the hot water in the separator 11 from flowing into pipe 25 and causing an energy loss. The flow rate of the cool water is preferably balanced to maximize the amount of hot water separated and flowing into line 16 while keeping the drop in hot water temperature in pipe 16 to a minimum. Thus, the flow rate of cool liquid is preferably sufficient to remove at least 95 vol % of the hot water from the separator and into pipe 16 with less than a 5° C. drop, more preferably less than a 2° C. drop in the separated hot water temperature relative to the hot water temperature in the absence of a cool water stream.

In the event that the flow rate of the cool water stream is high enough to travel into the inner annulus 14, it should be sufficiently low so as not to drastically reduce the temperature of the water exiting the separator 11 through liquid medium outlet pipe 16. While a measure of temperature reduction in the water through separator liquid medium outlet line 16 can be tolerated, the flow rate of the cold water stream injected from line 24 into the accumulated globules should be sufficient high and its temperature sufficiently low to prevent the globules to agglomerate if this problem in fact exists, and no further so as to minimize the temperature reduction of the water in line 16.

In other embodiments, however, it may actually be more desirable to significantly reduce the temperature of the water in line 16. For example, if the crystallizer piping 9 is sized to crystallize the globules at a low temperature, e.g. 110 to 120° C., and the feed rate of molten polymer to the cutter is high, and the temperature of the molten polymer is high, e.g. >240° C., the heat energy transferred from the globules to the water may be so large that it becomes desirable to feed water into the housing 7 through line 6 at a significantly reduced temperature to accommodate the large temperature delta between the feed into the housing 7 and the outlet of the housing 7 and in line 8. In sum, the flow rate and the water temperature of the cool water is adjusted to at least displace at least a portion of the hot water in the interstitial space between the globules, and optionally also to provide reduced or elimination of globule agglomeration and desired water temperature in the outlet line 16 which will be optimized for energy savings.

In yet another embodiment, the globules can be further cooled with a stream of cool liquid after globules are separated from the hot water. It may become desirable to further cool the pellets because after separation, globules which may otherwise merely accumulate without agglomerating at the bottom of the separator may, after separation, tend to stick to each other because the bulk of the fluid is removed. Even if the globules do not agglomerate, it may be desirable to slurry the globules with a stream of cool liquid to improve the ability to convey the stream of globules. Thus, a stream of cool water from water source 22 may be injected into line 19 through line 26 to cool the globules to any desired degree. If needed, this cool water stream can be used to cool the globules, but as above, the flow rate should be minimized to avoid energy costs associated with drying the water from the globules/pellets in the dryer 20. This cool water stream may be used in place of or in addition to the cool water stream injected into line 25 through line 24.

A part or all of the residual water recovered from the dryer 20 may be diverted into line 27 and fed into the fresh water source 22 to provide part of the feed for the cool water streams. Moreover, to maintain the water balance, in the event that a cool water stream is injected into the accumulated pellets in the separator 11, a portion of the water may be bled from the separator above the cool water feed point (not shown), such as toward the top of the vessel, and circulated back to the fresh water feed 22, allowed to cool by sitting in a reservoir which is drawn on as the cool water feed.

Water evaporated from the dryer is discharged from the dryer through line 28 and may be vented to the atmosphere. However, the heat energy in the evaporated water may be utilized to act as a source of energy recovery in other parts of a plant for making polyesters or solid state polymerizing polyesters, or it may be condensed and re-used elsewhere.

Water flowing in line 16 is optionally but preferably recirculated back to the housing 7, and if needed is re-pressurized by a pumping means 29 before or after (after is illustrated) passing through a heat exchanger 30 for either cooling or heating the water as needed to maintain the desired temperature balances. Prior to entering the housing 7, the water is preferably filtered in a filter 31 to remove entrained fines and particulates.

Thus, FIG. 2 illustrates an example of another embodiment wherein the polyester polymer is crystallized by:

a) directing a molten polyester polymer through a die, and b) before the temperature of the molten polyester polymer falls below its $T_g$, i) cutting the polymer into globules with a cutter;

ii) contacting the globules with a flow of liquid medium at a liquid medium temperature greater than the $T_g$ of the polyester polymer to form a flow of slurry. It is understood, of course, that the sequence between these two steps bi) and bii) can be in any order or simultaneously, and in most cases, the molten polymer exiting the inner surface of the die plate will be exposed to the hot liquid medium immediately before it is cut. The slurry flow of globules and hot liquid medium is iii) directed away from the cutter to a crystallizer and the globules reside in the crystallization zone under a pressure equal to or greater than the vapor pressure of the liquid medium for a time sufficient to impart a degree of crystallinity of at least 10% to the globules, thereby forming crystallized globules; and c) separating in a separation apparatus under a pressure equal to or greater than the vapor pressure of the liquid medium, the crystallized globules or resulting pellets from the liquid medium to form a stream of crystallized polyester polymer and a stream of separated liquid medium. Although steps biii) and c) are set apart in their description, it is understood that the separation apparatus can form part of the crystallization zone if the conditions in the separator are conducive to crystallize the globules. Moreover:

i) at least a portion of the source of the flow of liquid medium in step bii) is the stream of separated liquid medium; and ii) the stream of crystallized polyester polymer is directed to a dryer for removing at least a portion of the residual moisture on or in the crystallized polymer.

Once the globules are crystallized to the desired degree, and optionally but preferably dried to remove surface moisture left on the polymer from the crystallization step, the resulting crystallized pellets are transported to a machine for melt extruding and injection molding the melt into shapes such as preforms suitable for stretch blow molding into beverage or food containers, or extruding into other forms such as sheet. In another embodiment of the invention, there is provided a process for making a container such as a tray or a bottle preform suitable for stretch blow molding comprising:

d) drying polyester pellets crystallized from molten polyester polymer and having an It.V. ranging from 0.7 to 1.15 in a drying zone at a zone temperature of at least 140° C.;

e) introducing the dried pellets into an extrusion zone to form molten PET polymer; and f) forming a sheet, strand, fiber, or a molded part from extruded molten PET polymer.

It is preferred that these pellets have not been subjected to a solid state step for increasing their molecular weight. In this preferred embodiment, the pellets which are prepared for introduction into an extruder are not solid stated, yet have an It.V. sufficiently high such that the physical properties are suitable for the manufacture of bottle preforms and trays. The non-solid stated high It.V. pellets have been sufficiently crystallized to prevent them from agglomerating in the dryer at high temperatures of 140° C. or more.

Dryers feeding melt extruders are needed to reduce the moisture content of pellets. After dewatering the globules and/or pellets in the crystallizers, much of the remaining moisture on the surface of the pellets is driven off by drying the pellets. However, the pellets absorb ambient moisture during shipment from the manufacturer of the pellets to the converters who extrude the pellets into a mold with the desired shape. Further, not all the moisture in the pellet is driven off in a post crystallizer dryer. Therefore, the pellets are dried immediately prior to melt extruding. It is contemplated that the crystallized pellets dried after dewatering can be fed immediately to the melt extruder, thereby essentially combining both drying steps into a single drying step. In either case, however, prior to extrusion, the pellets are dried at a temperature of 140° C. or more to drive off most or all of the moisture on and in the pellet.

Dryers that effectively and efficiently reduce the moisture content and the acetaldehyde levels in the pellets are required immediately prior to melt extrusion. Moisture in or on pellets fed into a melt extrusion chamber will cause the melt to lose It.V. at melt temperatures by hydrolyzing the ester linkages with a resulting change in the melt flow characteristics of the polymer and stretch ratio of the preform when blown into bottles. While drying the pellets is a necessary step, it is desirable to dry the pellets at high temperatures to decrease the residence time of the pellets in the dryer and increase throughput. However, drying pellets at a temperature of 150° C. or more which have been crystallized at temperatures only of 100° C. or less will cause the pellets to agglomerate to each other, especially at the bottom of tall dryers where pellets experience the weight of the bed overhead.

Drying may be conducted at 140° C. or more, meaning that the temperature of the heating medium (such as a flow of nitrogen gas or air) is 140° C. or more. The use of nitrogen gas is preferred if drying is conducted above 180° C. to avoid oxidative thermal degradation. To dry at high temperatures while minimizing agglomeration in a conventional dryer equipped with or without an agitator, the pellets should be crystallized at temperatures of no more than 40° C. below the drying temperature. It is preferred that the pellets used have been crystallized at 140° C. or more. In this way, there is wide flexibility to set the drying temperature at 140° C. if desired, or 150° C. or 160° C., and so on up to about 200°

C. or less in the case the pellets have been crystallized at temperatures of 160° C. However, prudence would suggest setting the actual operational drying temperature at no more than about 40° C. above the crystallization temperature to minimize the risk of agglomeration and to leave a temperature cushion to take into account hot spots in the dryer and allow for temperature fluctuations which may occur from time to time.

In conventional processes which crystallize low It.V. amorphous pellets in a gaseous mixed bed, it is necessary to solid state the pellets to render them suitable for extrusion into molded parts such as preforms suitable for beverage containers. In this embodiment, pellets having an It.V. of 0.7 to 1.15 It.V. which have not been solid stated are dried at high temperatures of 140° C. or more. The process of this embodiment has the advantage of allowing drying at high temperature using pellets which have not been subjected to a costly solid stating step. Moreover, the incidence of agglomeration is reduced relative to the amount of agglomeration occurring in a dryer under the same operating conditions using pellets having the same It.V. and crystallized at a temperature of less than 120° C.

In general, the residence time of pellets in the dryer at 140° C. or more will on average be from 0.5 hours to 16 hours. Any conventional dryer can be used. The pellets may be contacted with a countercurrent flow of heated air or inert gas such as nitrogen to raise the temperature of the pellets and remove volatiles from inside the pellets, and may also be agitated by a rotary mixing blade or paddle. The flow rate of the heating gas, if used, is a balance between energy consumption, residence time of pellets, and preferably avoiding the fluidization of the pellets. Suitable gas flow rates range from 0.05 to 100 cfm for every pound per hour of pellets discharged from the dryer, preferably from 0.2 to 5 cfm per lb. of pellets.

Once the pellets have been dried, they are introduced into an extrusion zone to form molten polyester polymer, followed by extruding the molten polymer and forming a molded part, such as a bottle preform through injecting the melt into a mold or into a sheet or coating. Methods for the introduction of the dried pellets into the extrusion zone, for melt extruding, injection molding, and sheet extrusion are conventional and known to those of skill in the manufacture of such containers.

At the melt extruder, or in the melt phase for making the polyester polymer, other components can be added to the composition of the present invention to enhance the performance properties of the polyester polymer. These components may be added neat to the bulk polyester or can be added to the bulk polyester as a concentrate containing at least about 0.5 wt. % of the component in the polyester let down into the bulk polyester. The types of suitable components include crystallization aids, impact modifiers, surface lubricants, stabilizers, denesting agents, compounds, antioxidants, ultraviolet light absorbing agents, metal deactivators, colorants, nucleating agents, acetaldehyde reducing compounds, reheat rate enhancing aids, sticky bottle additives such as talc, and fillers and the like can be included. The resin may also contain small amounts of branching agents such as trifunctional or tetrafunctional comonomers such as trimellitic anhydride, trimethylol propane, pyromellitic dianhydride, pentaerythritol, and other polyester forming polyacids or polyols generally known in the art. All of these additives and many others and their use are well known in the art and do not require extensive discussion. Any of these compounds can be used in the present composition.

While an embodiment has been described for the drying of pellets which have not been solid stated, it is also contemplated that pellets which have optionally been solid stated are also dried at temperatures of 140° C. or more. Not only may containers be made from pellets crystallized according to the process of this invention, but other items such as sheet, film, bottles, trays, other packaging, rods, tubes, lids, filaments and fibers, and other injection molded articles. Beverage bottles made from polyethylene terephthalate suitable for holding water or carbonated beverages, and heat set beverage bottle suitable for holding beverages which are hot filled into the bottle are examples of the types of bottles which are made from the crystallized pellet of the invention.

This invention can be ftrther illustrated by the additional examples of embodiments thereof, although it will be understood that these examples are included merely for purposes of illustration and are not intended to limit the scope of the invention.

EXAMPLES

In each example, Differential Scanning Calorimetery data, and Gel Permeation Chromatography data are provided to describe the results obtained by crystallizing polyethylene terephthalate pellets from the glass in triethylene glycol as the liquid medium at various temperatures.

The DSC analysis to determine the initial melting point of the crystallized pellets was conducted according to the following procedure in each case:

Using a Mettler DSC821 instrument, the first heating scan was performed on a sample weighing 9–10 mg and with a heating rate of 20° C./min. Unless otherwise stated, the degree of crystallization in each case was also determined using the same DSC scan. In the first heating scan, the sum of the areas under any crystallization peaks was subtracted from the absolute value of the sum of the areas under any melting peaks. The difference was divided by 120 J/g (theoretical heat of fusion for 100% crystalline PET) and multiplied by 100 to obtain the percent crystallinity.

Results of DSC scans are reported as, and the percent crystallinity is calculated from any one of:

Low melting peak temperature: Tm1a

High melting peak temperature: Tm1b

Note that in some cases, particularly at low crystallinity, rearrangement of crystals can occur so rapidly in the DSC instrument that the true, lower melting point is not detected. The lower melting point can then be seen by increasing the temperature ramp rate of the DSC instrument and using smaller samples. A Perkin-Elmer Pyris-1 calorimeter was used for high-speed calorimetry. The specimen mass was adjusted to be inversely proportional to the scan rate.: About a 1 mg sample was used at 500° C./min and about 5 mg were used at 100° C./min. Typical DSC sample pans were used. Baseline subtraction was performed to minimize the curvature in the baseline.

In some cases where noted, percent crystallinity was also calculated from the average gradient tube density of two to three pellets. Gradient tube density testing was performed according to ASTM D 1505, using lithium bromide in water.

The GPC analysis to determine the approximate Ih.V. of the pellets was conducted according to the following procedure in each case:

Solvent:

95/5 by volume methylene chloride/hexafluoroisopropanol + 0.5 g/l tetraethylammonium bromide Temperature: ambient
Flow rate: 1 mL/min
Sample solution:
4 mg PET in 10 mL methylene chloride/hexafluoroisopropanol azeotrope (~70/30 by vol)+10 μL toluene flow rate marker. For filled materials, the sample mass is increased so that the mass of polymer is about 4 mg, and the resulting solution is passed through a 0.45 μm Teflon filter.
Injection volume: 10 μL
Column set: Polymer Laboratories 5 μm PLgel, Guard+ Mixed C
Detection: UV absorbance at 255 nm
Calibrants: monodisperse polystyrene standards, MW=580 to 4,000,000 g/mole, where
MW is the peak molecular weight.
Universal calibration parameters: (see note below)

PS K=0.1278 a=0.7089

PET K=0.4894 a=0.6738

The universal calibration parameters above were determined by linear regression to yield the correct weight average molecular weights for a set of five PET samples previously characterized by light scattering.

Calculation of inherent viscosity at 0.5 g/100 mL in 60/40 phenol/tetrachloroethane from the weight-average molecular weight, $<M>_w$ is determined as follows:

$$IhV = 4.034 \times 10^{-4} <M>_w^{0.691}$$

The solution viscosity relates to the composition and molecular weight of a polyester. Although the IhV numbers for the crystallized products were estimated by GPC, unless otherwise noted, the solution viscosity measurements were made on the starting materials for Example 1 and 2, i.e., amorphous pellets. The following equations describe the solution viscosity measurements and subsequent calculations as performed for PET.

$$\eta_{inh} = [\ln(t_s/t_o)]/C$$

where
$\eta_{inh}$=Inherent viscosity at 25° C. at a polymer concentration of 0.50 g/100 mL of 60% phenol and 40% 1,1,2,2-tetrachloroethane
ln=Natural logarithm
$t_s$=Sample flow time through a capillary tube
$t_o$=Solvent-blank flow time through a capillary tube
C=Concentration of polymer in grams per 100 mL of solvent (0.50%)

The intrinsic viscosity is the limiting value at infinite dilution of the specific viscosity of a polymer. It is defined by the following equation:

$$\eta_{int} = \lim_{C \to 0} (\eta_{sp}/C) = \lim_{C \to 0} \ln(\eta_r/C)$$

where
$\eta_{int}$=Intrinsic viscosity
$\eta_r$=Relative viscosity=$t_s/t_o$
$\eta_{sp}$=Specific viscosity=$\eta_r-1$ Instrument calibration involves replicate testing of a standard reference material and then applying appropriate mathematical equations to produce the "accepted" I.V. values.

Calibration Factor=Accepted IV of Reference Material/Average of Replicate

Determinations

Corrected IhV=Calculated IhV×Calibration Factor

The intrinsic viscosity (ItV or $\eta_{int}$) may be estimated using the Billmeyer equation as follows:

$$\eta_{int} = 0.5[e^{0.5 \times Corrected\ IhV} - 1] + (0.75 \times Corrected\ IhV)$$

Example 1

Triethylene glycol (TEG) was the liquid used in the following examples. For the first set of examples, three types of amorphous PET pellets were crystallized, and if needed, dried. Crystallization was done in a paddle-stirred crystallizer with an electrically heated jacket. The pellets were heated at 150° C. for 1 hour, followed by 1 h at 180° C. Since the melt was obtained by extruding pellets, it was necessary to crystallize the PET prior to the experiment in order that 1) the PET could be dried above $T_g$ without sticking, and 2) the PET would not crystallize in the extruder and subsequently wrap the screw. Moreover, in this Example 1 and in Example 2, the use of crystallized pellets having a thermal history prior to melt extrusion simulates a process wherein recycled or scrap PET is subjected to the process of the invention. The crystallized pellets were submitted for testing and extruded in an APV Sterling with a 1.25 inch screw. Extruder zones 1–4 were set at 280° C. and zone 5 (nozzle) was set at 260° C. The screw speed was lowered from ca. 100 rpm during transitions to 30 rpm during sample collection. The melt temperature was about 260° C. The extruder die having two ⅛ inch orifices was scraped clean with a spatula, molten polymer was extruded through one of the orifices, and the new strand was caught on one spatula while a second spatula was used to cut the strand and then held on top of the first to keep the strand on the spatula. Within about 5 seconds from collection, the molten strand was immersed into the TEG bath according to the procedure below. The time zero molten samples used as the reference were immediately submerged in ice water to quench and stop or prevent the induction of any crystallization. Other timed samples were caught the same way as the time zero samples; however, the molten strand was submerged within about 20 seconds from collection in 500 g of TEG at the temperature designated in Table 1 contained in a steel beaker fitted with a heating mantle, a variac, and a foil cover. It should be noted that the TEG target temperature on reference samples 102 et.seq. was targeted for 150° C. However, the actual measured values ranged from 152 to 154.3° C. It should be noted that the TEG target temperature on reference samples 105 et.seq. was targeted for 170° C. However, the actual measured values ranged from 167.5 to 168.7° C. When the indicated time of 1, 2, 4, 8 or 15 min. had passed, the molten polymer samples were quickly moved from the hot TEG bath into an ice water bath to quench the sample and to prevent further crystallization. Some of the runs with shorter times were repeated. After cooling for several minutes, the strands were towel-dried, cut with wire cutters and submitted for a first heating scan by DSC at 20° C./min where the sample sizes were 9 to 10 mg to determine the low melting peak temperature, the high melting peak temperature and the percent crystallinity. After the DSC sample was removed from each strand, the samples were routed for testing by GPC to estimate the Ih.V.

to the extruder. A high degree of crystallinity was obtained in a short time when crystallized at 170° C.

Table 1 also shows that there was a slight Ih.V. loss of about 0.013 dL/g. However, there did not appear to be much

TABLE 1

| Molten Polymer A* Sample # | Temp_ (deg C.) | Time (min) | Comments | Tm1a Peak Temp_(deg C.) | % Crystallinity | Est.. IhV (dL/g) | Tm1b Peak Temp_(deg C.) |
|---|---|---|---|---|---|---|---|
| 102-1 | 150 | 0 | | | 8.11 | 0.542 | 248.47 |
| 102-2 | 150 | 1 | | | 22.72 | 0.539 | 249.77 |
| 102-3 | 150 | 2 | | 166.82 | 34.41 | 0.54 | 248.15 |
| 102-4 | 150 | 4 | | 163.44 | 35.03 | 0.538 | 247.11 |
| 102-5 | 150 | 8 | | 166.52 | 35.46 | 0.539 | 248.88 |
| 102-6 | 150 | 15 | | 167.48 | 38.44 | 0.538 | 249.03 |
| 102-7 | 150 | 1 | repeat | | 27.37 | 0.54 | 248.13 |
| 102-8 | 150 | 0 | pellets | 171.45 | 39.28 | 0.56 | 247.49 |
| 105-1 | 170 | 0 | | | 9.00 | 0.541 | 249.09 |
| 105-2 | 170 | 1 | | | 28.96 | 0.533 | 248.43 |
| 105-3 | 170 | 2 | | | 39.68 | 0.534 | 250.17 |
| 105-4 | 170 | 4 | | 183.89 | 30.69 | 0.533 | 249.39 |
| 105-5 | 170 | 8 | | 177.9 | 33.47 | 0.533 | 248.37 |
| 105-6 | 170 | 15 | | 179.16 | 34.06 | 0.539 | 247.93 |
| 105-7 | 170 | 4 | repeat | 177.52 | 33.69 | 0.531 | 248.96 |
| 105-8 | 170 | 2 | repeat | 177.85 | 38.71 | 0.534 | 250.14 |
| 105-9 | 170 | 0 | pellets | 172.52 | 36.78 | 0.554 | 250.73 |

*Polymer A as a starting pellet was a 0.565 Ih.V. PET polymer modified with 2.2 wt. % 1,4-cyclohex-anedimethanol (CHDM) and 1.7 wt. % DEG.

The data shows that each of these samples crystallized at 150° C. in TEG, except for the molten, time-zero sample and the 1 min. sample and its repeat (102-1, -102-2, -102-7), had a low melting point detected at a 20° C./min DSC scan rate. The shortest timed samples (1 min. or less) appeared to be reorganizing on the time scale of the test. For these samples, a faster DSC scan rate could be used to see the low melting peak at about the crystallization temperature plus around 20° C. The 102-8 sample consisted of the conventionally crystallized pellets, i.e., the same ones that were fed to the extruder.

Figure 5:
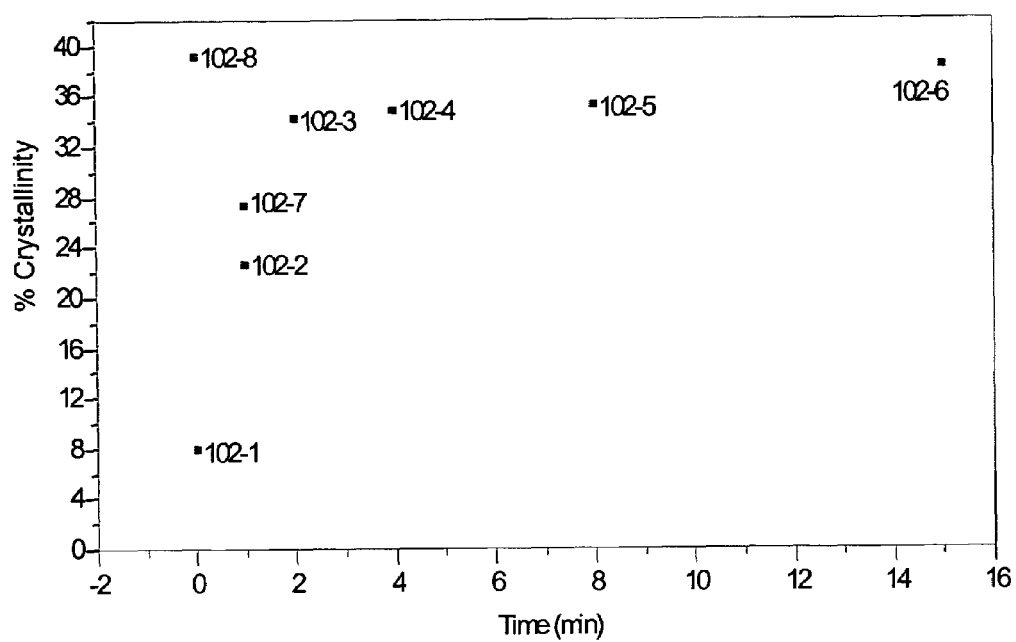
FIG. 5 graphically illustrates the data from Table 1 with respect to the increase in the degree of crystallinity over time at a crystallization temperature of 150° C.

FIG. 5 graphically illustrates the data from Table 1 with respect to the increase in the degree of crystallinity over time at a crystallization temperature of 1 50° C. The percent crystallinity increased with time until it leveled out around the mid-thirties after about two minutes. The 102-8 sample consisted of the conventionally crystallized pellets, i.e., the same ones that were fed to the extruder.

Table 1 also shows the estimated Ih.V. of the polymer melt over time at a crystallization temperature of 150° C. There did not appear to be much glycolysis at 150° C. as the Ih.V.'s for all the timed runs (15 min. maximum) are about the same.

The results set forth in Table 1 also set forth the low peak melting temperature of the molten polyester polymer crystallized over time in 170° C. TEG. By increasing the crystallization temperature from 150 to about 170° C., the low peak melt temperature increased by about 10° C.

Figure 6:
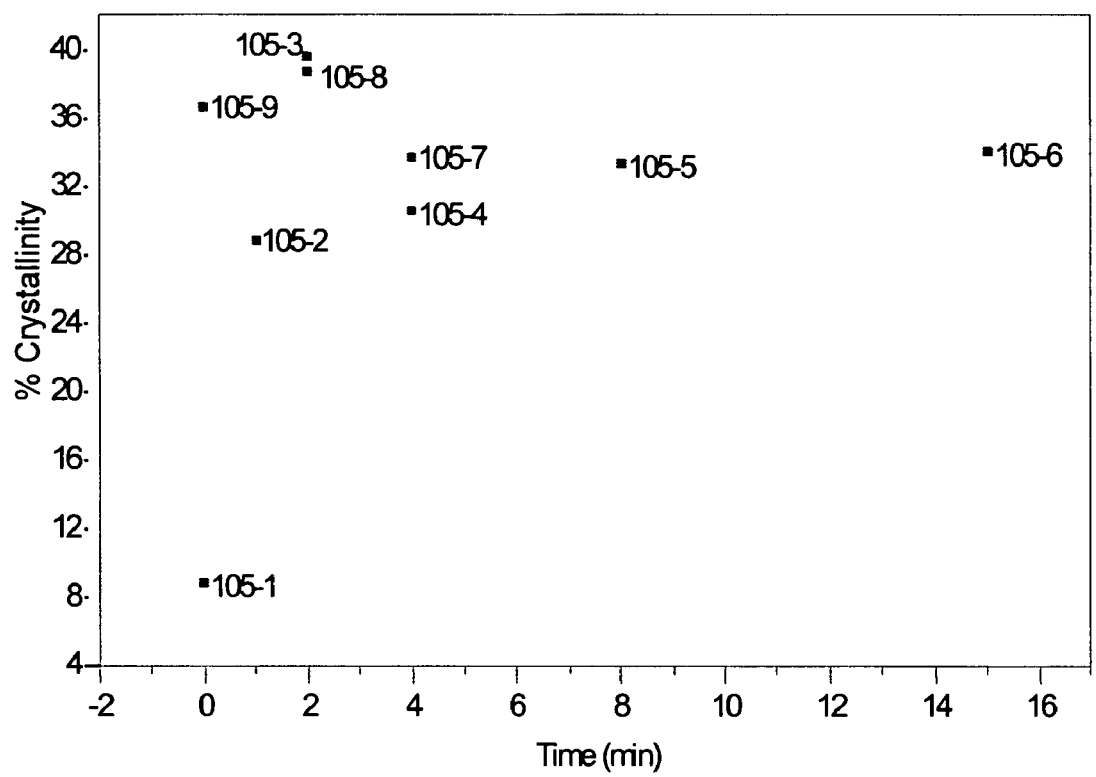
FIG. 6 graphically illustrates the degree of crystallization over time at a crystallization temperature of about 170° C.

The results in FIG. 6 and Table 1 also show the degree of crystallization over time at a crystallization temperature of about 170° C. The 105-9 sample consisted of the conventionally crystallized pellets, i.e., the same ones that were fed glycolysis at 170° C. as there was no clear trend of decreasing Ih.V. with increasing time.

Example 2

The same procedure as used in Example 1 was followed, except that a different polyester polymer was used as the test sample. The results are reported in Table 2.

TABLE 2

| Molten Polymer B Reference # | Temp_(deg C.) | Time (min) | Tm1b Peak Temp (deg C.) | % Crystallinity | IV (dL/g) |
|---|---|---|---|---|---|
| 103-1 | 150 | 0 | 245.12 | 4.98 | 0.727 |
| 103-2 | 150 | 1 | 246.33 | 11.58 | 0.723 |
| 103-3 | 150 | 2 | 245.7 | 24.28 | 0.725 |
| 103-4 | 150 | 4 | 246.37 | 32.17 | 0.73 |
| 103-5 | 150 | 8 | 247.2 | 29.20 | 0.721 |
| 103-6 | 150 | 15 | 245.5 | 29.80 | 0.724 |
| 103-7 | 150 | 2 | 247.25 | 22.14 | 0.727 |

*Polymer B as a starting pellet was a 0.79 Ih.V. PET polymer modified with 2.7 mole % isophthalic acid (IPA) and 3.7 mole % DEG.

Figure 7:
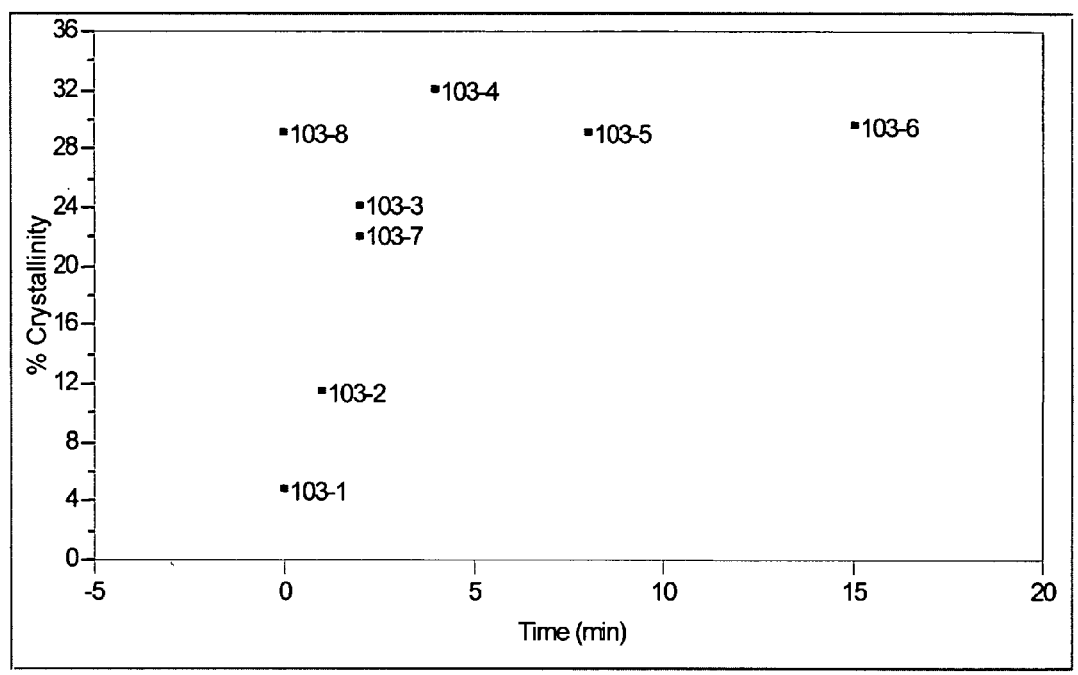
FIG. 7 graphically illustrates the data in Table 2 with respect to the degree of crystallinity obtained from the melt over time FIG. 8 graphically illustrates the degree of crystallization over time at a crystallization temperature of 150° C.

FIG. 7 graphically illustrates the data in Table 2 with respect to the degree of crystallinity obtained from the melt over time. As can be seen from FIG. 7, a high Ih.V. polymer melt successfully crystallized very quickly in 150° CTEG. Between 2 to 5 minutes, the molten polyester polymer had achieved a degree of crystallization of about 30% or more. The data in Table 2 also shows that the high Ih.V. polymer did not suffer glycolysis as there was no trend downward in its Ih.V. values.

Example 3

The previous samples and runs in the above examples were carried out by charging crystallized PET pellets, melting the pellets in an extruder to substantially erase its thermal history and crystallinity, followed by extruding the polymer melt and crystallizing it in hot TEG. The previously-crystalline extrudate may be nucleated by some remnant of its past heat history. Example 3 now demonstrates the effect of subjecting molten polymer exiting a melt-phase line which has no prior thermal crystallization history, to the process of the invention.

To demonstrate that a polymer melt exiting a melt phase line will also crystallize from the melt at a reasonable rate, the following experiment was conducted. Molten Polymer C had a similar composition as used in Example 1, that is, a 0.575 Ih.V. PET polymer modified with 2.2 wt % 1,4-cyclohexanedimethanol (CHDM) and 1.8 wt. % DEG, except that this polymer was not previously isolated as a pellet below $T_g$ nor crystallized from the glass (Molten Polymer C). Molten material obtained from a valve after the finisher and between the filter and the gear pump on a PET line was transferred to the 150° C. TEG bath within about 15–20 seconds from collection. The molten material was crystallized in 150° C. TEG for the times given below in Table 3:

TABLE 3

| Molten Polymer C Reference # | Temp_ (deg C.) | Time (min) | Tm1a Peak Temp_ (deg C.) | % Crystallinity | Est_ PM95 IV (dL/g) |
|---|---|---|---|---|---|
| 123-1 | 150 | 0 | | 1.94 | 0.565 |
| 123-2 | 150 | 1 | | 20.89 | 0.564 |
| 123-3 | 150 | 2 | | 20.07 | 0.566 |
| 123-4 | 150 | 4 | 165.1 | 37.93 | 0.563 |
| 123-5 | 150 | 8 | 168.13 | 39.85 | 0.563 |
| 123-6 | 150 | 15 | 170.47 | 37.83 | 0.557 |
| 123-7 | 150 | 1 | | 14.54 | 0.562 |
| 123-8 | 150 | 2 | | 28.14 | 0.562 |
| 123-9 | 150 | 4 | 174 (shoulder) | 44.43 | 0.564 |

The results indicate that crystallization from the melt of a newly made polymer that has no thermal crystallization history proceeded at a reasonable rate, and within less than 5 minutes had crystallized to about 35% or more. The low peak melt temperature was about 15 to 20° C. above the crystallization temperature. Moreover, crystallization from the melt of this polymer resulted in only very minor Ih.V. loss of 0.008; not a significant loss. The crystallization results are graphically illustrated in FIG. 8.

Figure 8:
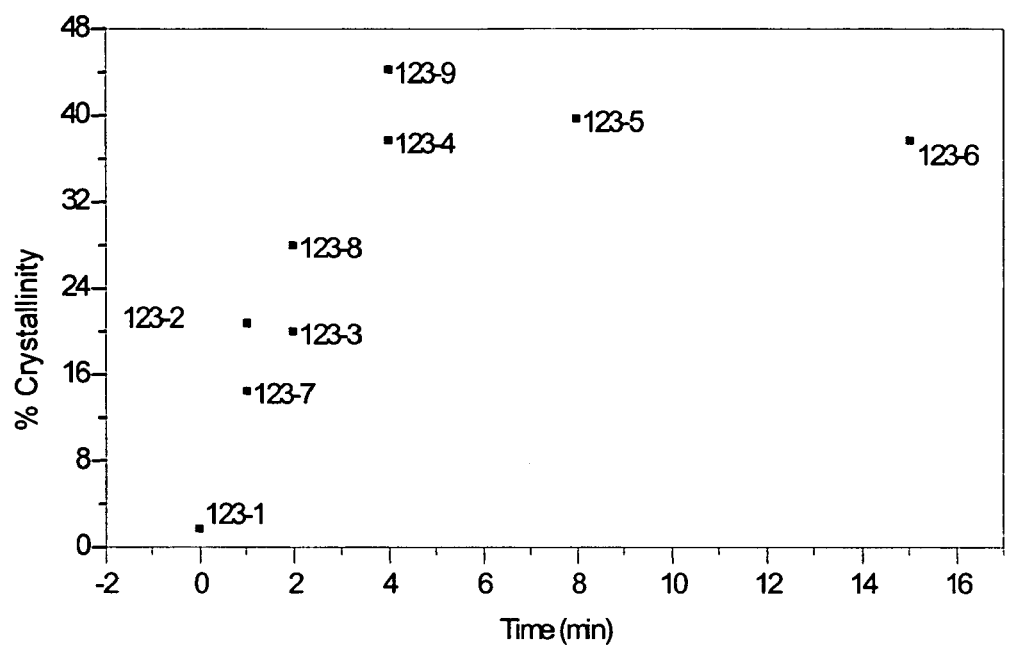

FIG. 8 shows that it took about 4 minutes to obtain above 30% crystallinity.

What is claimed is:

1. A process for crystallizing a polyester polymer comprising introducing a molten polyester polymer, made in the melt phase polycondensation process, into a liquid medium at a liquid medium temperature greater than the $T_g$ of the polyester polymer before the molten polyester polymer falls to a temperature below its $T_g$.

2. The process of claim 1, wherein the liquid medium temperature is above 100° C.

3. The process of claim 2, wherein the liquid medium temperature is above 130° C.

4. The process of claim 3, wherein the liquid medium temperature ranges from 140° C. to 180° C.

5. The process of claim 1, wherein the polyester polymer contains at least 60 mole % ethylene units based on the moles of all diols added and at least 60 mole % terephthalate units or naphthalate units based on the moles of all dicarboxylic acids added, and the It.V., of the molten polymer is at least 0.55 dL/g when measured at 25° C. in a 60/40 wt/wt phenol/tetrachloroethane solvent at a polymer concentration of 0.50 g/100 ml.

6. The process of claim 1, wherein the polyester polymer comprises a polyalkylene terephthalate homopolymer or copolymer modified with 40% or less of repeat units other than alkylene terephthalate.

7. The process of claim 1, wherein the molten polyester polymer is made in a melt phase polycondensation process and introduced into the liquid medium from the melt phase before the molten polyester polymer falls to a temperature below its $T_g$, and the It.V., of the molten polymer is at least 0.55 dL/g when measured at 25° C. in a 60/40 wt/wt phenol/tetrachloroethane solvent at a polymer concentration of 0.50 g/100 ml.

8. The process of claim 1, wherein the molten polyester polymer is obtained by heating a solid polyester pellet to above 190° C. followed by bringing the resulting molten polyester polymer into contact with the liquid medium before the temperature of the molten polyester polymer falls below the $T_g$ of the polymer.

9. The process of claim 1, wherein the molten polyester polymer is extruded in an extruder through a die at a temperature of 190° C. or more as measured at the extruder nozzle.

10. The process of claim 1, wherein the molten polyester polymer is directed through a die, followed by cutting the molten polyester polymer as it exits the die.

11. The process of claim 1, wherein the molten polyester polymer is cut underfluid in the liquid medium, and the It.V., of the molten polymer is at least 0.55 when measured at 25° C. in a 60/40 wt/wt phenol/tetrachloroethane solvent at a polymer concentration of 0.50 g/100 ml.

12. The process of claim 11, wherein the molten polyester polymer is cut underfluid into globules.

13. The process of claim 1, wherein the liquid medium temperature when the molten polyester polymer first makes contact with the liquid medium is above the $T_g$ of the polyester polymer, and the It.V. of the molten polymer is at least 0.70 dL/g when measured at 25° C. in a 60/40 wt/wt phenol/tetrachloroethane solvent at a polymer concentration of 0.50 g/100 ml.

14. The process of claim 1, wherein the molten polyester polymer first makes contact with a liquid medium at a temperature below the $T_g$ of the polyester polymer, and before the temperature of the molten polyester polymer falls below the $T_g$ of the polyester polymer, the liquid medium temperature is above the $T_g$ of the polyester polymer.

15. The process of claim 1, wherein the molten polyester polymer is cut underfluid when the temperature of the polyester polymer is at least 190° C.

16. The process of claim 1, comprising directing the molten polyester polymer having an It.V., when measured at 25° C. in a 60/40 wt/wt phenol/tetrachloroethane solvent at a polymer concentration of 0.50 g/100 ml, of at least 0.55 dL/g through a die plate and cutting the molten polyester polymer exiting the die with a cutter located in a liquid medium zone such that the cutter blades and a surface of the die plate are in contact with the liquid medium.

17. The process of claim 1, further comprising a liquid medium zone comprising a die plate and a cutter disposed in a housing containing an inlet and an outlet, and a flow of liquid medium into the housing through the inlet, wherein molten polyester polymer having an It.V., of at least 0.55 dL/g when measured at 25° C. in a 60/40 wt/wt phenol/tetrachloroethane solvent at a polymer concentration of 0.50 g/100 ml is directed through the die plate, cut with cutter blades on the cutter to form globules, and directed to the outlet of the housing as globules by the motive force of the liquid medium flow.

18. The process of claim 17, wherein the temperature of the liquid medium at the inlet of the housing is less than the temperature of the liquid medium beyond the outlet of the housing.

19. The process of claim 17, wherein the temperature of the liquid medium at the inlet and the outlet of the housing is above the $T_g$ of the polyester polymer.

20. The process of claim 17, wherein the molten polyester polymer is cut underfluid.

21. The process of claim 1, comprising directing molten polyester polymer through a die plate and cutting the molten polyester polymer underfluid as it exits the die with a cutter, wherein the cutter and an inner surface of the die plate are contained in a housing fed with a flow of hot liquid medium at a liquid medium temperature above the $T_g$ of the polyester polymer, and the liquid medium is essentially water.

22. The process of claim 21, wherein the temperature of the liquid medium ranges from 140° C. to 180° C.

23. The process of claim 1, comprising allowing the molten polyester polymer to reside in the liquid medium at a liquid medium temperature above the $T_g$ of the polyester polymer for a time sufficient to impart to the molten polyester polymer a degree of crystallinity of at least 15%.

24. The process of claim 23, wherein the degree of crystallinity is above 25%.

25. The process of claim 1, wherein the liquid medium comprises water.

26. The process of claim 1, wherein the liquid medium comprises a polyalkylene glycol.

27. The process of claim 1, wherein the temperature of the liquid medium contacting the molten polyester is greater than the boiling point of the liquid medium at 1 atmosphere.

28. The process of claim 1, comprising crystallizing the molten polyester polymer in the liquid medium at a pressure on the liquid medium which is equal to or higher than the vapor pressure of the liquid medium.

29. The process of claim 1, comprising a pressure on the liquid medium of greater than 25 psia.

30. The process of claim 29, comprising a pressure of 52 psia to 145 psia.

31. The process of claim 1, wherein the liquid medium has a flow to submerge globules obtained from the molten polyester polymer.

32. The process of claim 1, wherein the residence time of the molten polyester polymer or globules made from the molten polyester polymer in said liquid medium to obtain a degree of crystallinity of 20% or more is 10 minutes or less.

33. The process of claim 32, wherein the degree of crystallinity is 30% or more at a residence time of 4 minutes or less.

34. The process of claim 32, wherein the degree of crystallinity is 40% or more.

35. The process of claim of claim 32, wherein the liquid medium temperature ranges from 140° C. to 180° C., and the residence time to obtain a degree of crystallinity of 25% or more ranges from greater than 0 seconds to about 8 minutes or less.

36. The process of claim 1, wherein crystallization is conducted in the absence of rotating mechanically induced agitation.

37. The process of claim 1, comprising introducing a feed of liquid, colder than the liquid medium temperature, to the liquid medium containing crystallized polyester polymer or resulting pellets.

38. The process of claim 1, comprising crystallizing the molten polyester polymer in the liquid medium, followed by separating the liquid medium from the crystallized molten polyester polymer while the liquid medium temperature is above the $T_g$ of the polyester polymer.

39. The process of claim 38, comprising directing a cool flow of liquid onto the crystallized molten polyester polymer or resulting pellets after separation from the liquid medium, said cool flow of liquid having a temperature less than the temperature of the crystallized molten polyester polymer or resulting pellets.

40. The process of claim 1, comprising crystallizing the molten polyester polymer under a pressure equal to or greater than the vapor pressure of the liquid medium, followed by depressurizing the resulting crystallized molten polyester polymer or pellets, followed by separating said polymer or pellets from the liquid medium.

41. The process of claim 1, comprising crystallizing the molten polyester polymer under a pressure equal to or greater than the vapor pressure of the liquid medium, followed by separating said polymer or pellets from the liquid medium without substantially decreasing the pressure on the liquid medium immediately prior to separation.

42. The process of claim 1, comprising separating the liquid medium from the resulting crystallized molten polyester polymer or pellets while the pressure on the liquid medium prior to separation is greater than 1 atmosphere.

43. The process of claim 1, wherein the It.V. of the polyester polymer is 0.70 dL/g or greater when measured at 25° C. in a 60/40 wt/wt phenol/tetrachloroethane solvent at a polymer concentration of 0.50 g/100 ml, the liquid medium comprises water, the molten polyester polymer is cut underwater, and the crystallized polyester polymer is separated from the water under a pressure equal to or greater than the vapor pressure of water.

44. The process of claim 1, wherein crystallized molten polyester polymer or pellets are separated from the liquid medium under a pressure at or above the vapor pressure of the liquid medium with a rotary valve or dual knife-gate valves.

45. A process for separating a crystallized polyester polymer having an It.V., when measured at 25° C. in a 60/40 wt/wt phenol/tetrachloroethane solvent at a polymer concentration of 0.50 g/100 ml, of at least 0.55 dL/g from a liquid medium comprising introducing molten polyester polymer from a melt phase polycondensation process into hot liquid medium having a temperature greater than the $T_g$ of the polymer before the molten polyester polymer falls to a temperature below its $T_g$, thereafter forming a crystallized polyester polymer in the hot liquid medium, separating the crystallized polymer from the hot liquid medium under a pressure equal to or greater than the vapor pressure of the liquid medium, and directing a flow of cool liquid onto the crystallized polymer before separation, wherein the temperature of the cool liquid is less than the temperature of the hot liquid medium.

46. The process of claim 45, wherein the temperature of the hot liquid medium is at least 130° C., and the polyester polymer comprises a polyethylene terephthalate polymer or copolymer.

47. The process of claim 45, wherein the crystallized polyester polymer has a flow in a direction toward a separator, and the cool liquid medium travels countercurrent to the direction of the flow of crystallized polyester polymer.

48. The process of claim 45, wherein the hot liquid medium is separated from globules of crystallized polyester polymer, thereafter leaving a residual hot liquid medium within the interstices of the globules, and the cool liquid is directed onto the globules containing residual hot liquid medium to displace at least a portion of the residual hot liquid medium from the interstices of the globules before separation.

49. The process of claim 45, wherein the hot liquid medium is separated from globules of crystallized polyester polymer, thereafter leaving a residual hot liquid medium within the interstices of the globules traveling in a direction toward a separator, and the cool liquid directed onto the globules containing residual hot liquid medium has a flow rate which is effective to separate a greater amount of the hot liquid medium relative to the amount of hot liquid medium separated in the absence of a flow of cool liquid.

50. A process for crystallizing a molten polyester polymer comprising:
    a) directing molten polyester polymer from a melt phase polycondensation process through a die, and
    b) before the temperature of the molten polyester polymer falls below its $T_g$, first contacting the molten polyester with a liquid medium when the liquid medium temperature is greater than the $T_g$ of the polyester polymer and crystallizing the molten polyester polymer.

51. The process of claim 50, wherein the temperature of the molten polyester polymer on contact exceeds the temperature of the liquid medium.

52. The process of claim 51, wherein said molten polyester polymer is a polyethylene terephalate or naphthalate homopolymer or copolymer and having an It.V. of at least 0.55 when measured at 25° C. in a 60/40 wt/wt phenol/tetrachloroethane solvent at a polymer concentration of 0.50 g/100 ml.

53. The process of claim 52, wherein the temperature of the liquid medium temperature is at least 130° C.

54. A process for crystallizing a polyester polymer, comprising:
    a) directing a molten polyester polymer from a melt phase polycondensation process through a die, and
    b) before the temperature of the molten polyester polymer falls below its $T_g$, contacting the molten polyester with a liquid medium at a liquid medium temperature greater than the $T_g$ of the polyester polymer for a time sufficient to provide a crystallized polyester polymer having a degree of crystallinity of at least 10%, followed by
    c) separating, under a pressure equal to or greater than the vapor pressure of the liquid medium, the crystallized polyester polymer from the liquid medium.

55. The process of claim 54, wherein said molten polyester polymer is a polyethylene terephalate or naphthalate homopolymer or copolymer and having an It.V. of at least 0.55 dL/g when measured at 25° C. in a 60/40 wt/wt phenol/tetrachloroethane solvent at a polymer concentration of 0.50 g/100 ml.

56. The process of claim 55, wherein the temperature of the liquid medium temperature is at least 130° C.

57. The process of claim 54, wherein the separated crystallized polyester polymer is fed to a dryer to remove residual moisture from the polymer.

58. The process of claim 54, comprising directing a stream of cold liquid onto the molten polyester polymer prior to separation, wherein the temperature of the cold liquid is less than the temperature of the liquid medium.

59. The process of claim 54, comprising drying the separated crystallized polyester polymer, and directing a stream of cold liquid onto the crystallized polyester polymer after separation and before drying, wherein the temperature of the cold liquid is less than the temperature of the separated crystallized polyester polymer.

60. A process for crystallizing a polyester polymer, comprising
    a) directing a molten polyester polymer from a melt phase polycondensation process through a die, and
    b) before the temperature of the molten polyester polymer falls below its $T_g$,
        i) cutting the polymer into globules with a cutter;
        ii) contacting the globules with a flow of liquid medium at a liquid medium temperature greater than the $T_g$ of the polyester polymer to form a flow of slurry;
        iii) directing the flow of slurry away from the cutter to a crystallizer and allowing the globules to reside in the crystallization zone under a pressure equal to or greater than the vapor pressure of the liquid medium for a time sufficient to impart a degree of crystallinity of at least 10% to the globules, thereby forming crystallized globules; and
    c) separating in a separation apparatus under a pressure equal to or greater than the vapor pressure of the liquid medium, the crystallized globules or resulting pellets from the liquid medium to form a stream of crystallized polyester polymer and a stream of separated liquid medium, wherein:
        i) at least a portion of the source of the flow of liquid medium in step bii) is the stream of separated liquid medium; and
        ii) the stream of crystallized polyester polymer is directed to a dyer for removing at least a portion of the residual liquid on or in the crystallized polymer.

61. The process of claim 60, wherein the die has an inner surface facing the liquid medium, the molten polymer is cut with cutting blades as the polymer exits the orifices, and the cutting blades and at least a portion of the inner surface of the die plate are in contact with a liquid medium.

62. The process of claim 60, wherein the liquid medium comprises water.

63. The process of claim 60, wherein the flow of liquid medium has a liquid velocity ranging form 1 ft/s to 8 ft/s.

64. The process of claim 60, wherein the crystallizer comprises a pipe having an aspect ration of at least 15:1.

65. The process of claim 60, wherein the liquid medium temperature in the crystallizer ranges from 100° C. to 160° C.

66. The process of claim 60, wherein the pressure on the slurry within the crystallizer ranges from greater than 14.9 psia to 300 psia.

67. The process of claim 60, wherein the crystallizer comprises a pipe ranging from 120 to 9600 ft in length, at a diameter ranging from 4 to 8 inches.

68. The process of claim 67, wherein the slurry flows through the said pipe for 30 seconds to 15 minutes.

69. The process of claim 60, wherein liquid medium level in the separator is to at least the level of globule accumulation within the separator.

70. The process of claim 60, wherein the pressure in the separator is substantially the same as the pressure in the crystallizer.

71. The process of claim 60, wherein a portion of the liquid medium is vented or drained from the separator, cooled to below the liquid medium temperature in the separator, and then fed to the flow of liquid medium in step bii).

72. The process of claim 60, wherein at least a portion of the residual liquid from the dryer is re-circulated to the flow of liquid medium in step bii).

73. The process of claim 60, comprising contacting a stream of cold liquid with globules in the separator, said cold liquid having temperature which is less than the liquid medium temperature in the separator.

74. The process of claim 73, comprising re-circulating at least a portion of the residual liquid removed in the dryer to the source of cold liquid.

75. The process of claim 60, comprising contacting a stream of cold liquid with the stream of crystallized polymer after separation and before entering the dryer, the cold liquid having a temperature which is less than the crystallized polymer temperature.

76. The process of claim 75, comprising re-circulating at least a portion of the residual liquid removed in the dryer to the source of cold liquid.

77. The process of claim 1, wherein the molten polyester polymer has an It.V. of at least 0.70 dL/g when measured at 25° C. in a 60/40 wt/wt phenol/tetrachloroethane solvent at a polymer concentration of 0.50 g/100 ml.

78. The process of claim 77, wherein the molten polyester polymer has an It.V. of at least 0.75 dL/g when measured at 25° C. in a 60/40 wt/wt phenol/tetrachloroethane solvent at a polymer concentration of 0.50 g/100 ml.

79. The process of claim 45, wherein the molten polyester polymer has an It.V. of at least 0.70 dL/g when measured at 25° C. in a 60/40 wt/wt phenol/tetrachloroethane solvent at a polymer concentration of 0.50 g/100 ml.

80. The process of claim 79, wherein the molten polyester polymer has an It.V. of at least 0.75 dL/g when measured at 25° C. in a 60/40 wt/wt phenol/tetrachloroethane solvent at a polymer concentration of 0.50 g/100 ml.

81. The process of claim 50, wherein the molten polyester polymer has an It.V. of at least 0.70 dL/g when measured at 25° C. in a 60/40 wt/wt phenol/tetrachloroethane solvent at a polymer concentration of 0.50 g/100 ml.

82. The process of claim 81, wherein the molten polyester polymer has an It.V. of at least 0.75 dL/g when measured at 25° C. in a 60/40 wt/wt phenol/tetrachloroethane solvent at a polymer concentration of 0.50 g/100 ml.

* * * * *